United States Patent
Bard et al.

(10) Patent No.: US 8,407,136 B2
(45) Date of Patent: Mar. 26, 2013

(54) SYSTEM AND METHODS FOR PROVIDING STARTER CREDIT CARD ACCOUNTS

(75) Inventors: Keira Brooke Bard, Richmond, VA (US); Jeremy Paul Clifford, Arlington, VA (US); Scott Dalla Valle, Glen Allen, VA (US); Nathan Tad Czyzeswki, Arlington, VA (US); Baskaran Nadarajah, Richmond, VA (US); Peter Lackey, Glen Allen, VA (US); Wayne Thomas Sanchez, Sandy Hook, VA (US); Brian George Pilko, Arlington, VA (US)

(73) Assignee: Capital One Financial Corporation, McLean, VA (US)

( * ) Notice: Subject to any disclaimer, the term of this patent is extended or adjusted under 35 U.S.C. 154(b) by 2774 days.

(21) Appl. No.: 09/880,777

(22) Filed: Jun. 15, 2001

(65) Prior Publication Data
US 2003/0046222 A1    Mar. 6, 2003

(51) Int. Cl.
*G06Q 40/00* (2006.01)
(52) U.S. Cl. .......................................... 705/38; 705/35
(58) Field of Classification Search .................. 235/380; 705/41, 14, 35, 38
See application file for complete search history.

(56) References Cited

U.S. PATENT DOCUMENTS
6,018,718 A * 1/2000 Walker et al. .................. 705/14
2003/0061097 A1    3/2003 Walker et al.

OTHER PUBLICATIONS
"Sears Tests Starter Card," Card Fax News Brief, vol. 1997, n. 21, p. 1, Jan. 28, 1997.

* cited by examiner

Primary Examiner — Ojo O Oyebisi
(74) Attorney, Agent, or Firm — Finnegan, Henderson, Farabow, Garrett & Dunner LLP

(57) ABSTRACT

A system and method for providing starter credit card products to selected customers of a credit card issuer is disclosed. Methods, systems and articles of manufacture consistent with the present invention enable a credit card issuer to identify a group of customers that may not eligible to obtain standard credit card products offered by the credit card issuer. The credit card issuer may rank these customers and present offers for starter credit card accounts with adjusted account parameters tailored to these customers. The credit card issuer monitors the activities of each starter card account during a trial period to determine whether each respective account has met predetermined criteria. Based on the results of the monitor process, the credit card issuer may adjust the parameters associated with each starter credit card account. The adjustment may include increasing a credit limit of the starter credit card account if the predetermined criteria has been met, or conversely, restarting the trial period if an account has not met the predetermined criteria during the trial period. Once a starter card account that meets selected criteria during the trial period will graduate and receive new parameters and benefits defined by the credit card issuer.

77 Claims, 13 Drawing Sheets

FIG. 13

| STATEMENT STAGE | 1 | 2 | 3 | 4 | 5 | 6 | 7 | 8 | 9 | 10 |
|---|---|---|---|---|---|---|---|---|---|---|
| PAYMENT NUMBER | 0 | 1 | 2 | 3 | 4 | 5 | 6 | 7 | 8 | 9 |
| PASS 1 | -- | OTP | OTP | OTP | | | | | | |
| PASS 2 | -- | NO | OTP | OTP | OTP | | | | | |
| PASS 3 | -- | OTP | NO | OTP | OTP | OTP | | | | |
| PASS 4 | -- | OTP | OTP | NO | OTP | OTP | OTP | | | |
| FAIL 5 | -- | NO | OTP | LAG | LAG | | | | | |
| FAIL 6 | -- | OTP | NO | NO | LAG | LAG | | | | |
| FAIL 7 | -- | NO | NO | NO | LAG | LAG | LAG | | | |
| FAIL 8 | -- | OTP | OTP | NO | NO | LAG | LAG | LAG | | |
| FAIL 9 | -- | NO | NO | NO | NO | NO | LAG | LAG | | |
| FAIL 10 | -- | OTP | OTP | OTP | NO | NO | NO | LAG | LAG | |
| FAIL 11 | -- | OTP | NO | OTP | OTP | NO | NO | LAG | LAG | |
| FAIL 12 | -- | OTP | OTP | NO | OTP | OTP | NO | LAG | LAG | LAG |
| FAIL 13 | -- | OTP | OTP | NO | OTP | OTP | OTP | NO | LAG | LAG |

| NO PAYMENT MADE | OTP ON TIME PAYMENT MADE | NO PAYMENT MISSED | LAG LAG PERIOD | LOAD INTO DATABASE |
|---|---|---|---|---|
| 1340 | 1350 | 1360 | 1370 | 1380 |

SYSTEM AND METHODS FOR PROVIDING STARTER CREDIT CARD ACCOUNTS

DESCRIPTION OF THE INVENTION

1. Field of the Invention

This invention relates to credit card products and to systems and methods for providing and using such products. More particularly, the invention relates to systems and methods for providing starter credit card accounts to high credit risk customers that are monitored during a trial period.

2. Background of the Invention

Credit card products have become so universally well known and ubiquitous that they have fundamentally changed the manner in which financial transactions and dealings are viewed and conducted in society today. Credit card products are most commonly represented by plastic card-like members that are offered and provided to customers through credit card issuers (such as banks and other financial institutions). With a credit card, an authorized customer or cardholder is capable of purchasing services and/or merchandise without an immediate, direct exchange of cash. With each purchase, the cardholder incurs debt to their credit card account, which the cardholder may thereafter pay upon receipt of a monthly or otherwise periodic statement. In most cases, the cardholder will have the option to either fully pay the outstanding balance or, as a matter of necessity or choice, defer at least a portion or the balance for later payment with accompanying interest or finance charges for the period during which payment of the outstanding debt is deferred (also referred to as a revolving charge credit line).

The spending power of a credit card (i.e., the maximum amount of funds that is financed to the cardholder for making purchases) is typically limited to a particular amount that is predetermined by the issuer of the card. This amount is commonly referred to as the "credit limit" of the credit card. The credit limit provides the cardholder with a line of credit (also referred to as a credit line). The size of the issuer-imposed credit limit is generally based on a number of non-exclusive factors, the most important of which are often the cardholder's earning capacity and the cardholder's credit history. When purchases are made or debts incurred with the credit card, the available portion of the credit limit is reduced by the purchase or debt amounts. In addition, interest and/or finance charges are also subtracted from the available portion of the credit limit on a periodic basis. The total debits on a credit card are referred to as the "outstanding balance," while the remaining or available balance of the credit limit is typically called the "available balance" and reflects the dynamically adjusted current spending power of the credit card. The cardholder may increase the available balance up to the credit limit, by paying the outstanding balance to the issuer.

Although the financial benefits of possessing credit card accounts are obvious, the disadvantages of abusing such accounts are sometime overlooked by cardholders. Mismanagement of credit card accounts (not to mention other types of financial accounts such as mortgages, vehicle loans, etc.) can result in a credit profile that creditors, including credit card issuers, view as high risk. A high risk credit profile may prevent that individual from receiving credit card products from a credit card issuer. This not only affects the individual in a negative manner (e.g., the loss of potential spending power, but the credit card issuer as well (e.g., the loss of a potential customer).

SUMMARY OF THE INVENTION

It is therefore desirable to have a method and system that enables a credit card issuer to provide starter credit card accounts to customers who have credit profiles that prevent them from obtaining standard credit card accounts.

Methods, systems and articles of manufacture consistent with the present invention enable a credit card issuer to identify a group of customers (or potential customers) that are not eligible to obtain standard credit card products offered by the credit card issuer. The credit card issuer may rank the customers included in the group based on predetermined criteria, such as credit history and earning capacity. Once the credit card issuer has ranked the group of customers, various offers for a starter credit card account are presented to each customer, based on their ranking. Subsequently, starter credit card accounts are provided to those customers who have accepted the offers. The starter credit card accounts are associated with predetermined parameters that are designed particularly for the identified customers, and may include, for example, interest rates of zero percent, and reduced credit limits.

Additionally, methods, systems and articles of manufacture enable the credit card issuer to set a trial period for each starter credit card account and perform a process that monitors the activities of each account during the trial period to determine whether each respective customer has met predetermined criteria. In one aspect of the invention, the predetermined criteria may be a number of consecutive on-time monthly payments.

Based on the results of the monitor process, methods, systems, and articles of manufacturer adjust the parameters associated with each starter credit card account. In one aspect of the invention, the adjustment may include increasing a credit limit of the starter credit card account if the predetermined criteria has been met. In another aspect of the invention, if a customer has not met the predetermined criteria during the trial period, the adjustment may include restarting the trial period, and removing the customer from the group of customers. Eventually, a customer who meets selected criteria during the trial period may even be able to graduate to obtain a standard credit card account with standard parameters and benefits associated with these types of accounts.

Accordingly, methods, systems, and articles of manufacturer, enable customers included in the group of identified customers to have an opportunity to improve their credit profile, while at the same time obtain a line of credit that can be used to purchase goods and/or services that normally would not have been obtainable. Moreover, methods, systems, and articles of manufacturer, enable credit card issuers to retain individuals who normally would have been lost as potential customers based on their credit profile, while at the same time minimizing the risk of providing credit card accounts to high risk customers by controlling the parameters associated with these accounts.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

FIG. 13 illustrates an exemplary starter credit card account code table, consistent with features and principles of the present invention.

DETAILED DESCRIPTION

Figure 1:
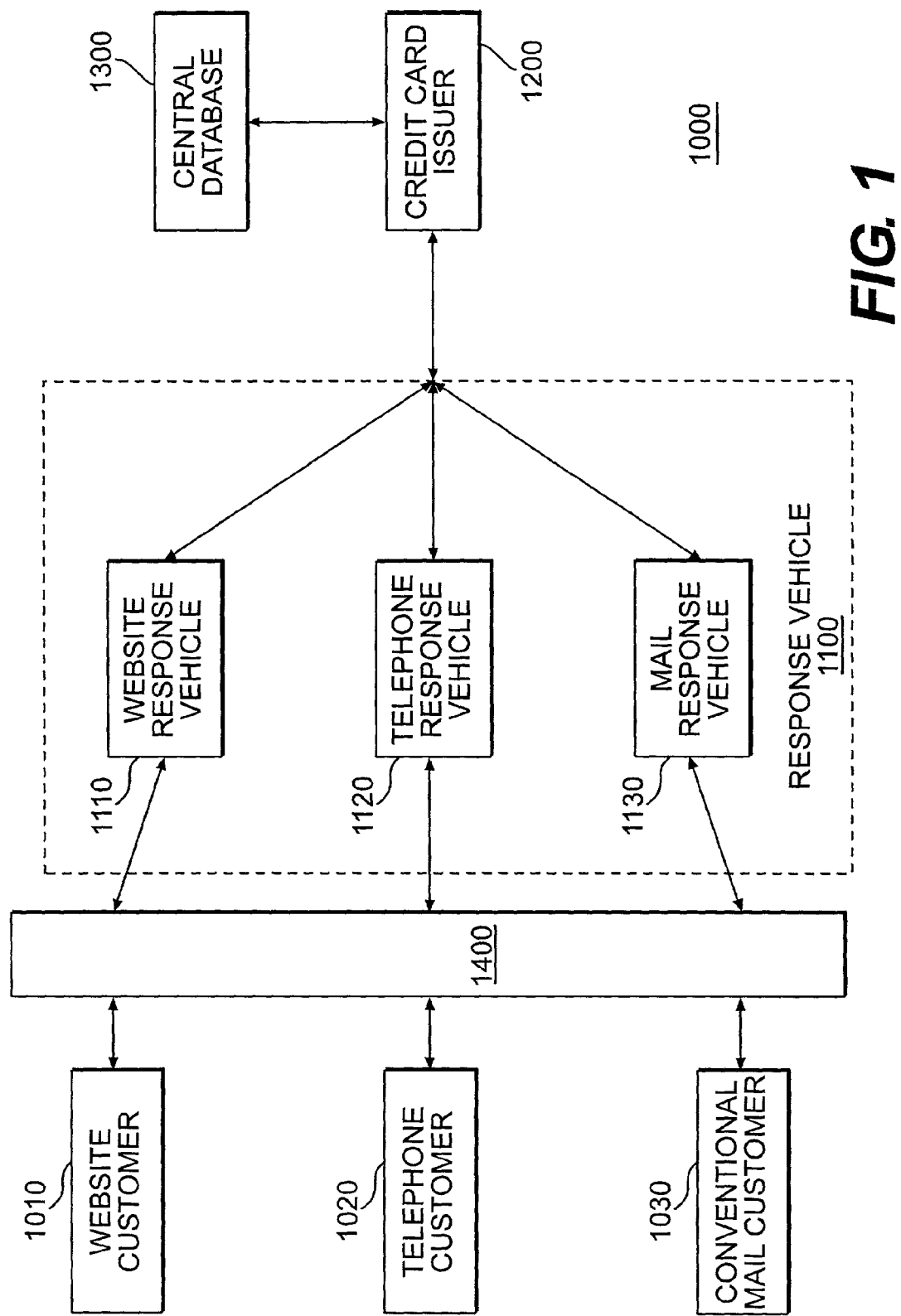
FIG. 1 illustrates an exemplary block diagram of an environment from which methods and systems consistent with features and principles of the present invention may be implemented.

Methods, systems and articles of manufacture consistent with the present invention enable a credit card issuer to present starter credit card products to customers who are ineligible for standard credit card products. A target customer process identifies a group of customers that are targeted for the trial starter card product. Once the group is established, the target customer process ranks the customers in the group based on a pre-selected criteria, such as their credit profile. Based on their ranking, a customer is offered a starter credit card account with predetermined parameters for a predetermined trial period. The parameters may vary based on the ranking of a customer, and may include, credit limits, interest rates, and penalty fees. Also, the customer may be notified of graduation parameters, which are parameters that each customer may obtain if they meet certain criteria during the trial period.

Once the applications have been received from trial customers who have accepted an offer for a starter credit card account, for the approved applications, a loader process loads starter credit card account information, such as the parameters discussed above, into a target customer database. The information loaded into this database may also include a type of starter credit card offer, or "product cell" that is associated with each trial customer, account level messages, and payment status for the account.

After a starter credit card account has been loaded into the target customer database, a monitor process begins to monitor the activities associated with each account. The activities monitored may include the timeliness of monthly payments and whether a credit limit has been exceeded. The monitor process may periodically check the status of each starter credit card account by using the loader process to access information within the target customer database, and compare it to current status information for each account. Based on the analysis, the monitor process determines whether the predetermined criteria for each starter credit card account has been met, or is on target to be met. For example, a customer who has made timely payments to the credit card issuer for three consecutive months may be designated as a "graduated" customer, and the parameters associated with that customer's starter credit card account may change. In one aspect of the invention, the customer is taken off the trial period, and provided an upgraded credit card account. This may include an increased credit limit and reduced penalty fees.

On the other hand, if a customer does not meet the predetermined criteria associated with their starter credit card account, the monitor process may adjust the account's parameter's accordingly. In one aspect of the invention, the monitor process may give a delinquent customer a "second" chance by restarting the trial period and allowing the customer to try again to meet the predetermined criteria for their account. On the other hand, the monitor process may revoke the privileges of the starter credit card account from a delinquent customer, and adjust the parameters of their account accordingly, such as decreasing the credit limit, increasing the interest rate, and/or accessing penalty fees.

Methods, systems and articles of manufacture enable a credit card issuer to offer credit account products to high credit risk customers that normally would not be eligible to receive such products. In addition to the availability of these types of products, customers may also benefit from tailored parameters associated with each credit account. A credit card issuer (or other financial institution) may offer starter account products that include little or no interest rates with manageable credit limits to aid a customer in making timely payments. The credit card issuer also benefits from the start credit account products. New customers are marketed that may be trained to be more fiscally responsible. Although these new customers may be high credit risks, the risk is reduced by the tailored parameters associated with each starter credit account offered. That is, a credit card issuer may offer low credit limits that reduces the amount of loss to both the customer and credit card issuer in the event the customer defaults on account payments. Therefore, as described above, and explained in further detail below, methods and systems consistent with features and principles of the present invention provide credit account products that are beneficial to both the consumer and account provider.

Reference will now be made in detail to the exemplary embodiments of the invention, examples of which are illustrated in the accompanying drawings. Wherever possible, the same reference numbers will be used throughout the drawings to refer to the same or like parts.

The above-noted features and other aspects and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

FIG. 1 illustrates an exemplary system environment 1000 in which the features and principles of the invention may be implemented. As illustrated in FIG. 1, the system environment 1000 may include a plurality of customers (1010-1030), a response vehicle system 1100 including a plurality of different response vehicles (1110-1130), a credit card issuer 1200, a central database 1300 and a communications channel 1400.

Each customer in system environment 1000 is associated with a different customer category. For instance, customer(s) 1010 may be web site customer(s) that access and retrieve information through a web site. This web site may be a branded web site that is operated by one or more vendors, or may be a web site operated by the card issuer. Customer(s) 1020 may be telephone customers that access and receive information using conventional telephonic communication techniques and systems. This includes, for example, and wireless telephony systems. Customer(s) 1030 may be conventional mail customer(s) that access and receive information by conventional mail techniques and services. This includes, for example, customer(s) that are part of a credit card issuer's mailing list. Customer(s) 1010-1030 may also represent entities (such as an individual, a group of individuals, corporate entities, or any combination thereof), that hold credit card accounts with the credit card issuer 1200. The categories of customer(s) illustrated in FIG. 1 are exemplary and should not be considered limiting. For example, a variety of different customer categories may also be implemented in environment 1000, such as customers using kiosk computers or personal digital assistants (PDAs).

Response vehicle 1100 represents a system for handling communications between the customer(s) 1010-1030 and credit card issuer 1200. Response vehicle 1100 may be part of a credit card issuer's network and, as shown in FIG. 1, includes a plurality of response vehicles 1110-1130 that correspond to different category groups of customer(s) 1010-1030. Each response vehicle is responsible for handling communications to and from a particular customer. For example, telephone response vehicle 1120 handles telephonic communications between the customer 1020 and credit card issuer 1200. Thus, in the event credit card issuer 1200 wishes to solicit customers telephonically, response vehicle 1120 includes the necessary systems to support such operations. This may include a customer service telephone line that allows a customer service representative to communicate with a customer 1020, in accordance with features and principles of the present invention. Response vehicle 1130, on the other hand, includes the necessary systems and organizations to handle conventional mail processing to and from customer(s) 1030. Furthermore, response vehicle 1110 may include any type of web server hardware and software that handles requests and responses to/from network applications used by a computer system operated by customer 1010. For example, website customer 1010 may by using a personal computer to access a web page maintained by a server system operated by response vehicle 1110.

Response vehicle system 1100 may receive responses from the customer(s) and forward them to card issuer 1200 for appropriate processing. Notifications to the customer(s) also are performed from issuer 1200 to the customer(s) through response vehicle 1100. It should be noted that the present invention is not limited to the configuration and even use of the response vehicle 1100. Environment 1000 may be configured to accept communications from customers 1010-1030 using other forms of interfaces that facilitate communications between the credit card issuer and the multitude of mediums customers may use to communicate in system environment 1000.

Communication channel 1400 facilitates communications between the various customer(s) and response vehicle system 1100 illustrated in FIG. 1. Such communications may include communications related to offering and issuing starter credit card products. Communications channel 1400 may include, for example, a telephony-based network, a local area network (LAN), a wide area network (WAN), a dedicated intranet, the Internet, and/or a wireless network. Further, any suitable combination of wired and/or wireless components and systems may be incorporated into communications channel 1400. Any suitable combination of point-to-point communications or networked communications may also be incorporated into communication channel 1400 to facilitate communication between the different entities illustrated in FIG. 1. Moreover, any part of communication channel 1400 may implemented through traditional infrastructures or channels of trade, (e.g., the U.S. Postal System) to permit manual, automatic, or in-person communications between the various entities illustrated in FIG. 1.

Credit card issuer 1200 receives information from response vehicle system 1100 and processes it using central database 1300. Database 1300 may contain various information including credit information, potential customer lists, risk scores for potential extra credit customers, approved starter credit card customers, credit limits for approved cardholders, customer information, purchase information, authorization information, and/or settlement information. Issuer 1200 also sends information to the response vehicle system 1100 for delivery to the appropriate customers. Credit card issuer 1200 is responsible for providing various credit cards and establishing associated accounts. Credit card issuer 1200 may include one or more of the following: a bank, an acquiring bank, a merchant bank, a merchant or any commercial institution capable of providing a credit card consistent with the features disclosed herein. Further, although FIG. 1 only illustrates one credit card issuer 1200, it is of course possible that more than one credit card issuer be provided in system environment 1000.

Figure 2:
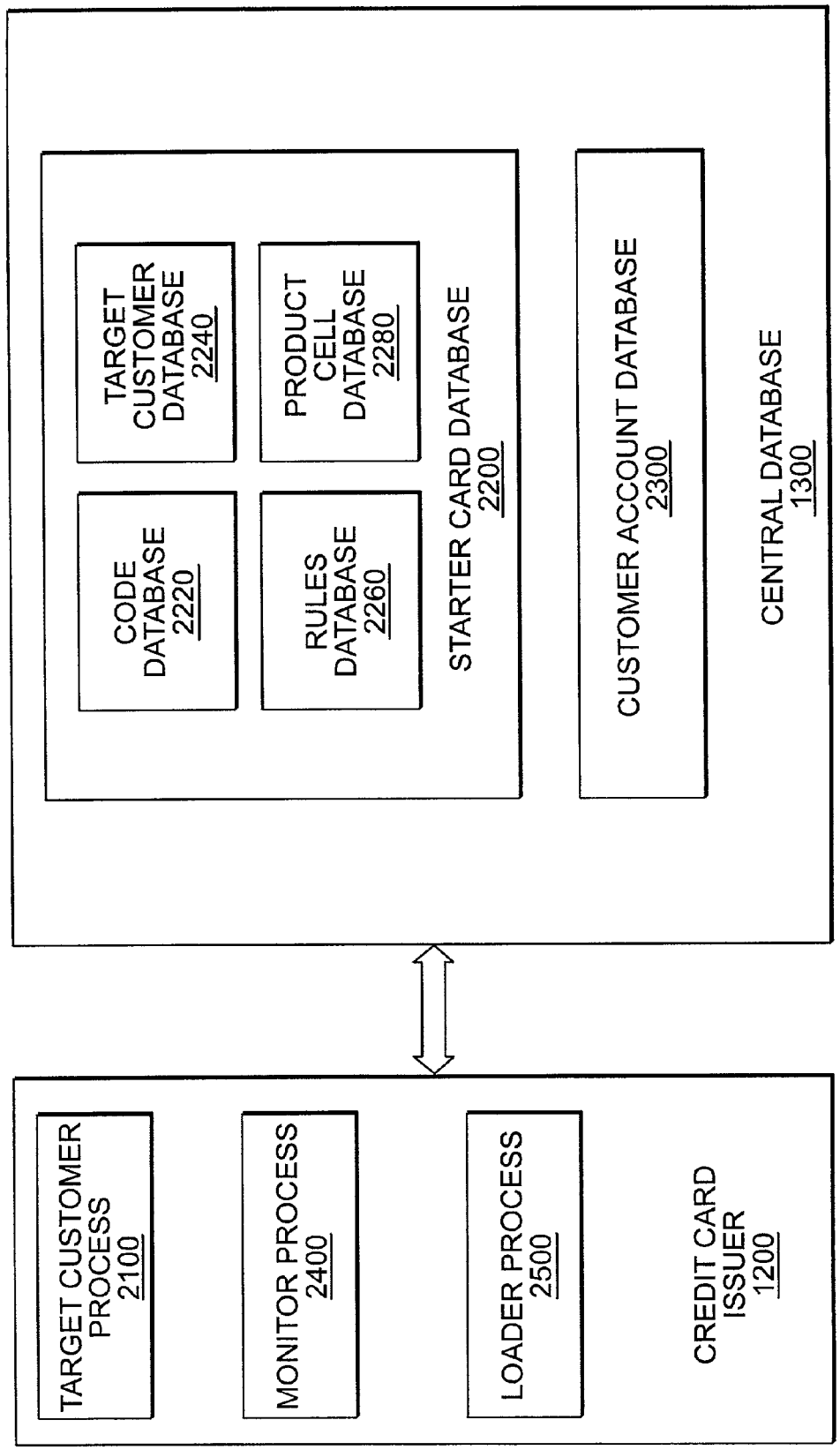
FIG. 2 illustrates an exemplary block diagram of a credit card issuer and central database, consistent with features and principles of the present invention.

To better describe the features and principles consistent with the present invention, FIG. 2 illustrates an exemplary block diagram of credit card issuer 1200 and central database 1300. As shown in FIG. 2, credit card issuer 1200 may include a target customer process 2100, monitor process 2400 and loader process 2500. Central database 1300 may include two separate databases: starter card database 2200, and customer account database 2300. Starter card database may further comprise code database 2220, target customer database 2240, rules database 2260 and product cell database 2280. It should be noted that the configuration in FIG. 2 is exemplary and not intended to be limiting. That is, although FIG. 2 shows separate processes within credit card issuer 1200, these processes may be configured into a single process, or further separated into additional sub-processes that perform the functions associated with features and principles of the present invention. The same is true for central database 1300. Although FIG. 2 shows two separate databases 2200 and 2300, this configuration may be modified to accommodate a single database or, alternately, a number of separate databases that collectively perform functions consistent with features and principles of the present invention.

Target customer process 2100 may be configured to identify and group target customers for starter credit card accounts provided by credit card issuer 1200 consistent with features and principles of the present invention. Target customer process 2100 may also be configured to solicit offers and receive responses to/from potential starter credit card account customers and perform ranking functions that will be described later with reference to FIG. 4. Additionally, target customer process 2100 may also configure the starter card accounts and initialize parameters associated with each customer's starter card account in accordance with features and principles of the present invention.

Monitor process 2400 may be configured to perform a periodic (or continuous) analysis of starter card accounts during a predetermined trial period associated with each starter card account. This process will be described later with reference to FIGS. 5-12. Monitor process 2400 may also be configured to update the parameters and information associated with each starter card account based on the results of the analysis of each account during the trial period.

Loader process 2500 may be configured to interact with target customer process 2100 and monitor process 2400 to transfer data to and from central database 1300. Loader process 1200 may receive instructions or commands from monitor process 2400 and/or target customer process 2100 to access and modify selective information stored in any database included in central database 1300. Loader process 2500 may also be configured to transfer starter card account information stored in starter card database 2200 to customer account database 2300. Description of the interaction between loader process 2500 and the other elements depicted in FIG. 2 will be further described later, with reference to FIGS. 3-12.

Central database 1300 may be configured to store credit card account information for credit card issuer 1200. Central database 1300 may be implemented as any type of memory device or configuration that enables credit card issuer 1200 to perform the features and principles consistent with the present invention. As shown in FIG. 2, central database 1300 includes two separate databases: starter card database 2200 and customer account database 2300. Starter card database 2200 may be configured to store information associated with the starter credit card accounts consistent with features and principles of the present invention. This may include, but is not limited to: (1) starter card code data, which may be stored in code database 2220; (2) starter card account information, which may be stored in target customer database 2240; (3) rule data, which may be stored in rules database 2260; and (4) product cell information, which may be stored in product cell database 2280.

Starter card code data, which may be stored in code database 2220, may be data representing particular types of actions and data associated with each starter card account. This information may be previously defined by credit card issuer 1200 and utilized by monitor process 2400 and target customer process 2220 to associate each starter card customer with specific actions and events that need to be performed by credit card issuer 1200. The types of actions and data that may be represented in code database 2220 include, but is not limited to, account level messages that reflect a message to be presented to a starter card customer, letter codes that reflect predefined letters or communications that may be sent to a starter card customer, and call center action codes that reflect a particular type of message presented to call center personal communicating with a starter card customer. Table I shows an exemplary list of account level messages ("ALMs"), Table II shows an exemplary list of letter codes, and Table II shows an exemplary list of call center action codes (McACTN), that each may be implemented by methods and systems consistent with features and principles of the present invention. Further description of these codes and their implementation within system environment 1000 will be described later.

TABLE I

ALM Message Codes

| ALM CODE | MESSAGE |
|---|---|
| A | You will receive a credit line increase after <X> consecutive on-time payments. (Variable X: 3, 2 more, or 1 more) |
| B | Congratulations! Because of your excellent payment history during the trial period, your account terms have changed. Your new credit limit is <XXX>. Changes to your account terms will be reflected on your next statement. (Variable XXX: CL—Credit Limit) |
| C | Your account is past due. As a result, your trial period is over. However, because you are a valued customer, we are offering you a second trial period with a introductory interest rate on purchases. |
| D | Your account is past due. As a result, your trial period is over and your account terms have changed. These changes will be reflected on your next statement. |
| E | Welcome to CREDIT CARD ISSUER NAME. We hope you enjoy your trial period with an introductory interest rate on all purchases. And remember, when you make your minimum monthly payments on time, you will receive a credit line up to <XX> when the trial period ends. Variable XX: Variable Credit Line Increase based on product cell |

TABLE II

Letter Codes

| LETTER CODE | TYPE OF LETTER |
|---|---|
| A | Retrial Letter- Presents information similar to ALM Code "C" |
| B | Graduation PASS Letter- Presents information similar to ALM Code "B" |
| C | Graduation FAIL Letter- Presents information similar to ALM Code "D" |

TABLE III

McACTN Codes

| McACTN CODE | MESSAGE FOR CALL CENTER |
|---|---|
| A | Customer Enrolled in Trial Program |
| B | Trial Failed. New Trial Granted |
| C | Trial Passed. Graduated to New Terms |
| D | Trial 2 Failed. Graduated to New Terms |

Starter card account information, stored in target customer database 2240, may include account information for each starter card customer. The starter card account information may be configured as a database reflecting each starter card customer, and associated parameters associated with each respective starter card account. The parameters may represent, for example, statement codes that reflect the trial stage period a particular customer is currently within, account level message codes, letter codes, call center codes, product cell codes (which will be described with reference to product cell database 2280), payment status codes that reflect whether a respective customer has made timely payments, and graduation codes that reflect whether a respective customer has met trial period criteria associated with their starter card account. It should be noted, that additionally parameters may be included or removed from the target customer database 2240, without departing from the scope of the present invention.

Rules database 2280 may store rule data that reflects particular actions and operations that monitor process 2400 may perform during an analysis of each customer's starter card account. For example, the rules data may reflect what codes to modify in the target customer database 2240 based on the results of an analysis performed on a starter card account. Target customer process 2100 may also use rules database 2260 to initialize values for each customer in target customer database 2240.

The product cell data stored in product cell database 2280 may reflect particular parameters associated with an offered starter card account. These parameters may include, but is not limited to, starter credit card credit limits, interest rates, trial period information, maintenance fee data, penalty fee data, and credit limit increase values. Product cells may be separated into a selected number of cells that include different starter credit card account parameters. Each product cell may be designated for particular types of starter card customers, based on their credit ranking, or credit profile. Each product cell may correspond to a particular financial product offered by a credit card issuer and how that product is marketed. Table IV shows an exemplary list of various product cells and their associated parameters, consistent with features and principles of the present invention.

The GRAD. parameters reflect values that will be set when a starter card account has graduated, or when a customer has met selected criteria during the trial period. For example, the GRAD. CL reflects a new credit limit a starter credit card account will receive after graduation. The GRAD. APR % reflects a new annual percentage interest rate the starter card account may receive. The GRAD. MMF parameter reflects monthly maintenance fees that may be accessed to a graduated starter card account. And, the GRAD. penalty fee parameter reflects the types of fees that may be assessed to a graduated starter card account for overlimit and late payments after the trial period has ended.

Product cell 6, shown in Table IV, may reflect a product cell that is offered only over telephonic mediums, while product cells 1-5 may be offered though electronic mediums (such as the Internet and Web sites) as well as conventional mail mediums.

The Copy Version code associated with each product cell reflects a type of message that may be included with an initial offer presented to a potential customer of the starter credit card product provided by credit card issuer 1200. These versions may vary depending on the type of message a credit card issuer wishes to convey. For exemplary purposes only, Table V shows a list of copy version codes and their corresponding messages.

TABLE V

Copy Version Codes

| COPY VERSION CODE | MESSAGE |
|---|---|
| A | Frontsell Message Mentions CL |
| B | Frontsell Message Does not Mention CL |
| C | Downsell Message-Denial of initial account request, offer of Starter credit Card Account- Mentions CL |

TABLE IV

Product Cell Codes

| Product Cell (Copy Version) | Trial CL | Trial APR % | Trial MMF | Trial Late Fee | Trial OL Fee | GRAD. CL | GRAD. APR % | GRAD. MMF | GRAD. Penalty Fees |
|---|---|---|---|---|---|---|---|---|---|
| 1 (A) | $300 | 0 | $0 | $10 | $0 | $400–$1000 | 14.9 | $6 | Regular |
| 2 (B) | $300 | 0 | $0 | $10 | $0 | $400–$1000 | 14.9 | $6 | Regular |
| 3 (C) | $400 | 0 | $0 | $10 | $0 | $500–$700 | 19.8 | $6 | Regular |
| 4 (D) | $100 | 0 | $0 | $15 | $10 | $200–$500 | 19.8 | $6 | Regular |
| 5 (C) | $50 | 0 | $0 | $20 | $10 | $200–$300 | 20.0 | $6 | Regular |
| 6 Phone Call | $200 | 0 | $0 | $15 | $0 | $300–$700 | 18.5 | $6 | Regular |

As shown in Table IV, each product cell include parameters that vary based on the type of cell. The trial CL parameter reflects a credit limit during a trial period for the starter card account. The trial APR % parameter reflects an annual percentage interest rate associated with the starter card account during the trial period. The MMF parameter reflects a monthly membership fee assessed to the starter card account during the trial period. The trial late fee parameter reflects fees assessed to a starter card account is a late payment is received during the trial period, while the trial OL fee parameter reflects fees assessed to a starter card account when the trial CL parameter is exceeded during the trial period.

TABLE V-continued

Copy Version Codes

| COPY VERSION CODE | MESSAGE |
|---|---|
| D | Downsell Message-Denial of initial account request, offer of Starter credit Card Account- does Not Mention CL |

It should be noted that the information shown in Tables I-V are not intended to be limiting. That is, each of the parameters, messages, and product cells shown in Tables I-V may be defined and modified by credit card issuer 1200 to reflect various types of such information that may be associated with a starter card account consistent with features and principles of the present invention.

Referring back to FIG. 2, central database 1300 may also include customer account database 2300. Customer account database 2300 may include starter credit card account information for each customer of credit card issuer 1200 associated with standard credit card accounts. Standard credit card accounts are associated with all types of credit card accounts offered by a credit card issuer, other than the trial starter card credit card accounts consistent with features and principles of the present invention. For example, this may include, but is not limited to, GOLD or PLATINUM type credit cards offered to selected customers. Standard credit card accounts may include terms, parameters, benefits, and/or conditions that are more favorable than those of a starter credit card account. More favorable parameters, terms, etc., may be considered more acceptable, and/or less financially restrictive in comparison to other parameters, terms, etc., for example those associated with a starter credit card account. For example, a credit limit of $1500 may be considered more favorable than a credit limit of $500. Also, a combination of parameters associated with a standard credit card account may be considered more favorable than a combination of parameters associated with a starter credit card account. For instance, a standard credit card account may be associated with a credit limit of $1500 and an interest rate of 19.5%. This combination of parameters may be considered more favorable than a credit limit of $100 and an interest rate of 0% associated with a starter credit card account.

Returning back to FIG. 2, the account information included in customer account database 2300 may be data that allows credit card issuer 1200 to manage the credit card accounts associated with its customers, and may include, but is not limited to, credit limits, interest rates, penalty fees, payment history information, and customer profile data.

As shown in FIGS. 1 and 2, environment 1000 is configured to allow credit card issuer 1200 to perform functions consistent with features and principles of the present invention. To better understand the invention, FIGS. 3-12 illustrate exemplary processes performed by the various elements of FIGS. 1 and 2.

Figure 3:
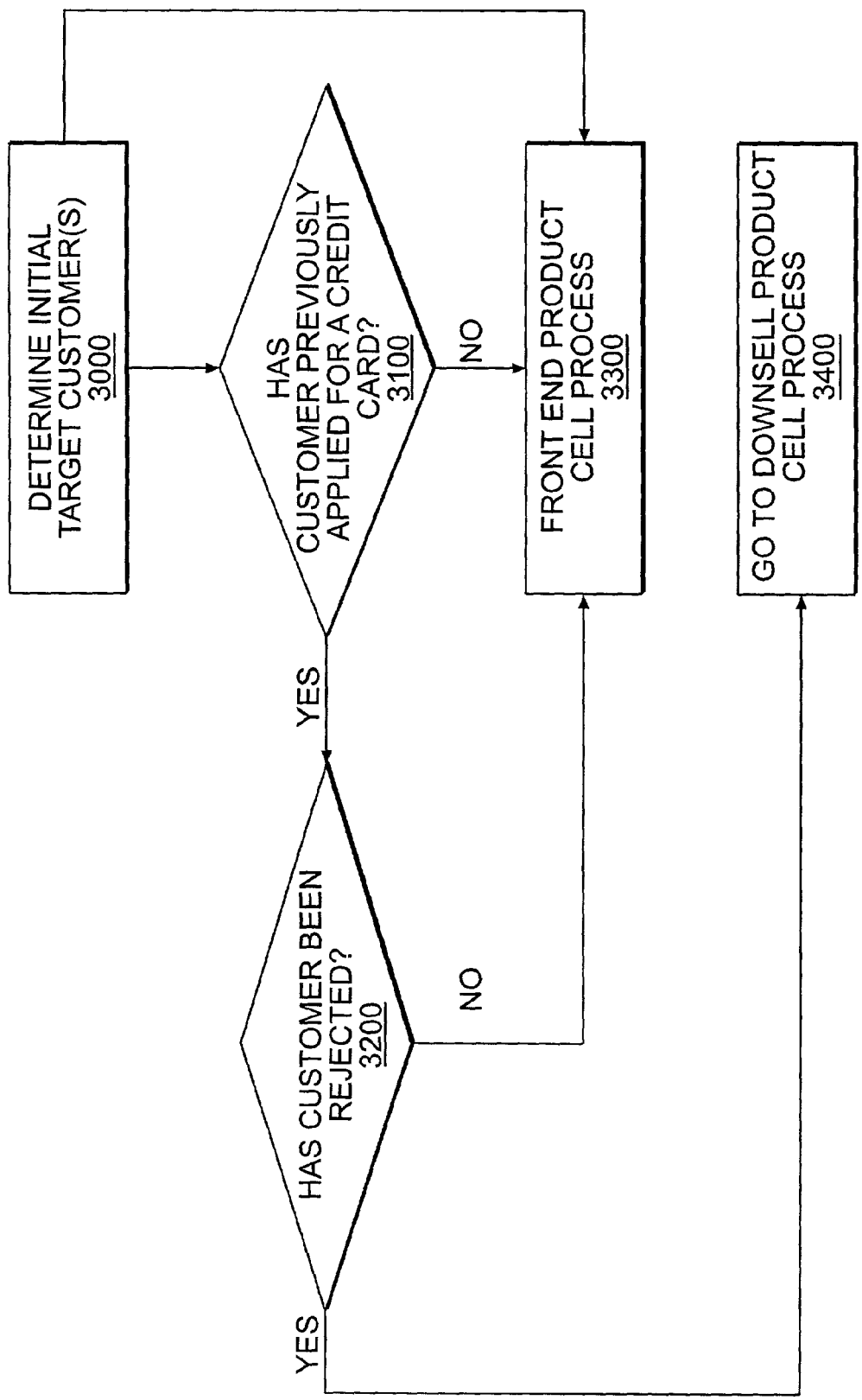
FIG. 3 illustrates an exemplary flowchart of a process to determine target customers, consistent with features and principles of the present invention.

FIG. 3 shows an exemplary process performed by target customer process 2100, consistent with features and principles of the present invention. Once credit card issuer 1200 has established and defined its products cells, rules, and codes needed for managing starter credit card accounts, the target customer process 2100 may begin to locate and solicit potential customers to participate in the trial program. In one aspect on the invention, target customer process 2100 may identify two types of potential customers: front-end and downsell customers. Front-end customers may be customers who have not applied for a credit card product from credit card issuer 1200 and are determined to be high credit risks based on their credit profiles. Thus, credit card issuer 1200 may initially offer such front-end customers a starter card account. Downsell customers may include customers who have previously requested a credit card product from credit card issuer 1200, but have been rejected. The rejection of a credit card product may be based on the customer's credit profile, but other factors may apply as well. The present invention is not limited to a particular method for screening potential customers, but generally contemplates performing a screening process to identify customers who may not normally be offered standard credit card products from a credit card issuer. For downsell customers, the target customer process 2100 may identify applicants who have previously requested credit card products from credit card issuer 1200 and may have been declined because of their credit profiles.

To determine the type of customers credit card issuer 1200 is interested in extending starter card offers, target customer process 2100 determines an initial target group of customers (Step 3000). To evaluate and identify specific target starter card customers, several factors may be considered by the card issuer 1200. Such factors may be based on credit information received from one or more credit information sources (e.g., sources that provide credit information to credit card issuer 1200). Credit information may also be provided to credit card issuer 1200 when customers respond to credit card offers from issuer 1200. Moreover, credit information maybe requested by issuer 1200 while determining a target customer group to extend starter card offers. Credit information may include credit history information and/or personal information (e.g., income, employment status, etc.) that is used when evaluating a customer's credit worthiness. Credit information sources may comprise commercial credit information source (such as TRW/Experian, Equifax and TransUnion or a similar commercial credit service bureau) and/or private credit information services. Credit information sources may also represent credit information that was provided by customers, such as when a customer applied for their existing credit card.

The credit information is analyzed to determine the credit worthiness or a level of risk associated with each cardholder. If a customer meets selected criteria defined by credit card issuer 1200, target customer process 2100 may approve the customer for inclusion in a target customer group.

Potential customers may be identified and stored in a separate database (not shown) or provided by remote entities that store credit information on individuals. Once an initial target group of customer is obtained from these potential customers, target customer process 2100 determines whether each target customer has previously applied for a credit card product from credit card issuer 1200 (Step 3100). If the customer has (Step 3100; YES), target customer process 2100 determines whether the customer was rejected for any type of credit card product (Step 3200). In the event the customer has not been previously rejected by credit card issuer 1200, (Step 3200; NO), or never applied for a credit card product (Step 3100; NO), a front end process is performed (Step 3300) described with reference to FIG. 4. However, if the customer was previously rejected for a credit card product form credit card issuer 1200 (Step 3200; YES), a downsell process is performed (Step 3400), also described with reference to FIG. 4.

It should be noted that the sequence of steps illustrated in FIG. 3 are not intended to be limiting. That is, target customer process 2100 may access its own database of customers who have been refused credit card products by credit card issuer 1200, and begin the downsell process (Step 3400) for those customers. Additionally, the front-end process (Step 3300) may be performed for identified potential starter card customers who have not previously applied for a credit card product from credit card issuer 1200.

Figure 4:
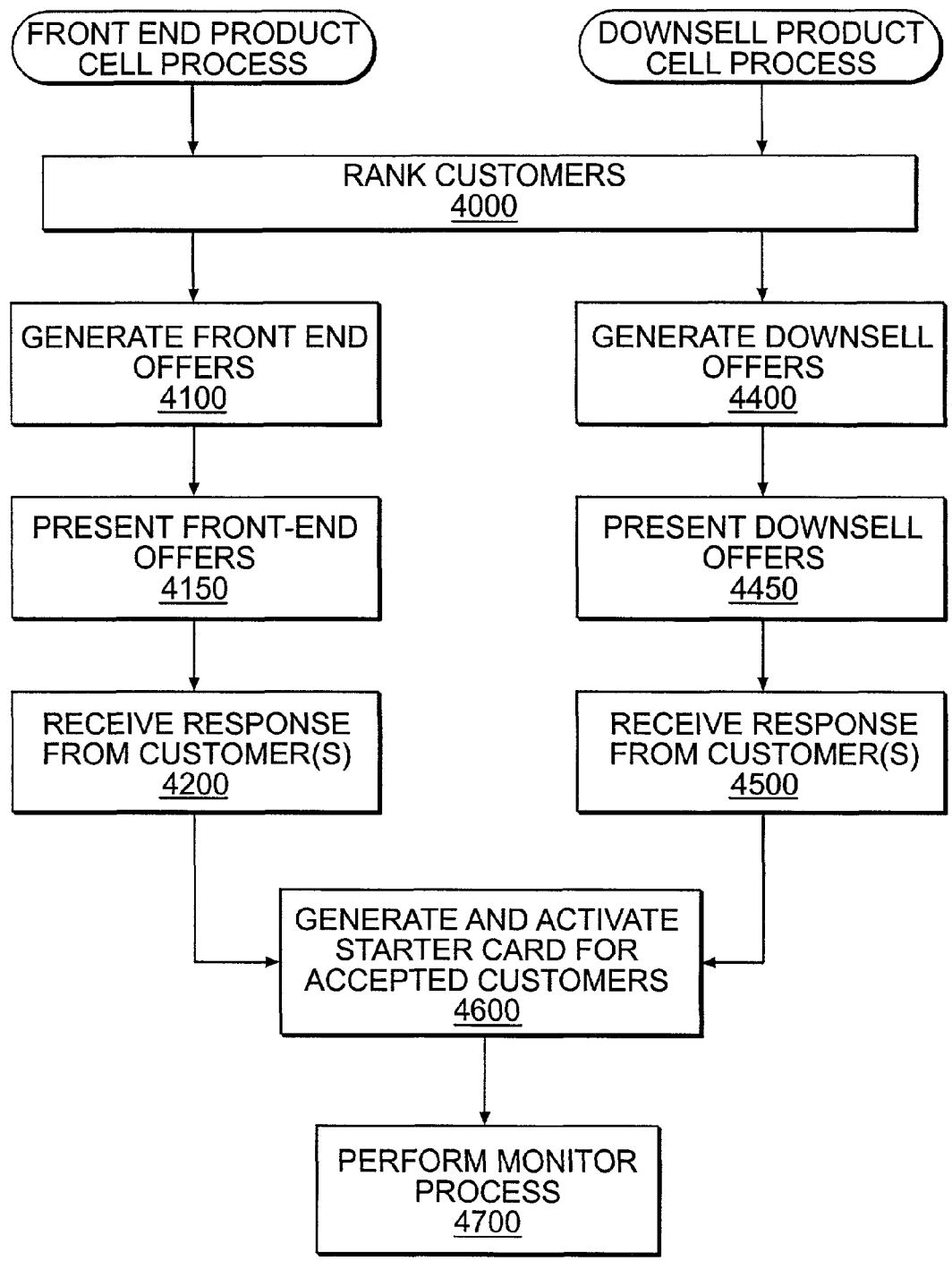
FIG. 4 illustrates an exemplary flowchart of front-end and downsell processes, consistent with features and principles of the present invention.

FIG. 4 illustrates an exemplary process associated with extending starter card offers and processing responses to the offers. Target customer process 2100 performs both front-end and downsell processes for credit card issuer 1200. For each process, product cells stored in product cell database 2280 are accessed by target customer process 2100, using loader process 2500, to associate each target starter card customer with a particular product cell. This may be performed by ranking the target customers included in the target group based on their credit profile (Step 4000). For example, the customer ranking may be separated into 20 levels, with level 1 reflecting target customers with the best credit profile and level 20 reflecting customers with the worst credit profile. Accordingly, based on a target customer's ranking, a starter card customer account entry may be created in target customer database 2240 with a corresponding product cell code parameter. Alternately, target customer process 2100 may manage a separate database (not shown) that includes potential target customers for a starter card account, and corresponding product cell information, that are used merely to generate offers for a starter card account. As shown in Table IV, the product cell codes correspond to various product cells that include the terms of a starter account, as well as information associated with a particular product cell will be marketed. For example, a target customer that is assigned product cell 1 from Table IV, will receive an offer that is marketed based on the copy version code "A." As shown in Table V, copy version "A" indicates to credit card issuer 1200 to present an offer without mentioning a credit limit. Of course, variations of each code and their marketing messages may vary, based on the marketing strategy of the financial institution (e.g., credit card issuer 1200) implementing methods and systems consistent with features of the present invention.

Once the appropriate product cells are associated with each potential customer, target customer process 2100 generates and presents offers for a starter card account to the respective customers (Steps 4100, 4400). Based on the product cell and the type of customer (downsell or front-end), an offer is generated for each target customer. Thus, each offer may vary for each customer based on the product cell associated with that customer. That is, a customer with a high credit risk (and high credit level rank) may be offered a starter credit card account with parameters corresponding to product cell 5, shown in Table IV. Another customer with a lower credit risk, on the other hand, may be offered a starter card account with parameters corresponding to product cell 1.

Once the offers are generated, they are sent to response vehicle system 1100 (see FIG. 1) for distribution to the customers. Each response vehicle in vehicle 1100 processes the offers in order to provide them to the customers through the proper medium or communication channel. For instance, response vehicle 1110 formulates offers for generation and viewing on one or more web sites. Response vehicle 1130, on the other hand, processes the offers for presentation to customers through conventional mail techniques. Once each response vehicle has processed the offers, they are sent to the specified customers for responses (Steps 4150 and 4450). Customers 1010-1030 respond to the offers using the medium associated with their category. The responses are sent back to response vehicle system 1100, where they are processed for presentation to card issuer 1200 (Steps 4200 and 4500).

There may be a plurality of variations available to card issuer 1200 when communicating with customers. That is, a mail customer 1030 may wish to respond by telephone or through a web site. Additionally, customers may respond by one medium, and request notification by another. For instance, a customer 1030 who has received an offer in the mail, may respond by mail, yet request notification through a website and the Internet. Accordingly, a variety of user friendly options are available to customers for receiving and responding to the offers presented by card issuer 1200. The above descriptions are for illustration purposes alone and should not be viewed as limitations to the present invention. One of ordinary skill in the art would realize that any number of combinations of a communication techniques may be implemented without departing from the principles of the present invention.

Once target customer process 2100 receives the responses from the target customers, it determines which customers accepted their respective offers. Each customer who has accepted their respective offer are associated with a target customer starter card account that includes parameters corresponding to the product cell associated with their offer (Step 4600). The customers are then presented with a starter credit card product that may be used to purchase goods and/or services, similar to a standard credit card product. Once a target customer has been included in target customer database 2240, monitor process 2400 begins its monitoring functions, consistent with features and principles of the present invention (Step 4700).

Monitor process 2400 monitors the starter credit accounts stored in target customer database 2240 to determine whether particular criteria are met during a trial period. The criteria associated with each starter card account may be determined by target customer process 2100 when the starter card accounts are loaded into target customer database 2240. In one aspect of the invention, the criteria may be set for each target customer as requiring a predetermined number (such as "3") of consecutive on-time payments before a starter card account graduates. Other criteria may be used to supplement or compliment the payment criteria, such as overlimit criteria. Furthermore, a trial period may also be set by target customer process 2100 when the starter accounts are created. In one aspect of the invention, each starter card account may be associated with a trial period of a predetermined number of months, such as six or eight. In another aspect of the invention, the trial period may be dynamic, and change according to the activities of a starter card account. For instance, a trial period may extend beyond eight months in the event a customer misses a payment associated with their starter card account every third month. Of course, this period may also be configured to end after a certain number of repetitions.

Figure 5:
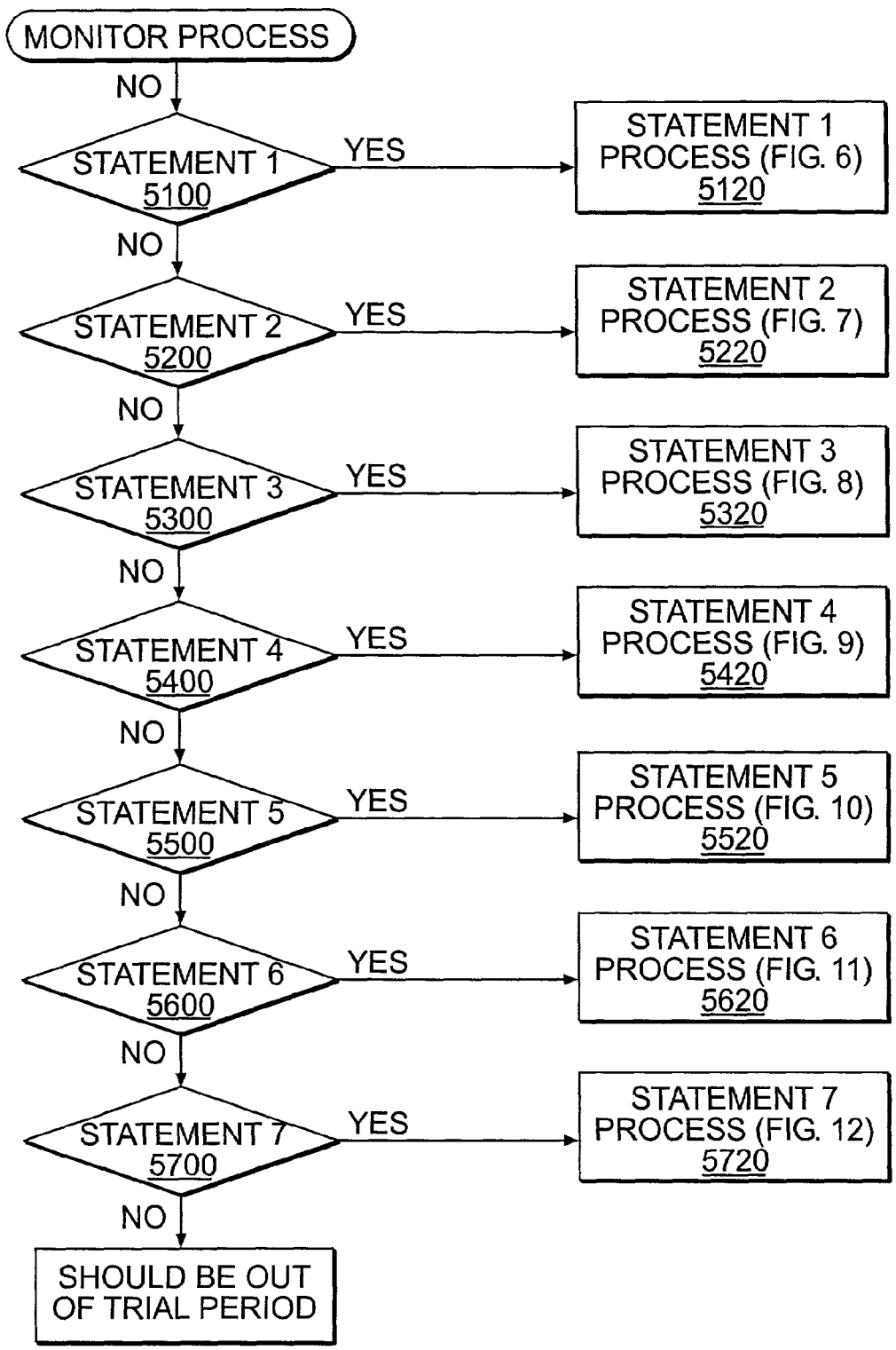
FIG. 5 illustrates an exemplary flowchart of a monitor process, consistent with features and principles of the present invention.

FIG. 5 illustrates the functions performed by monitor process 2400 as part of step 4000 of FIG. 4 when analyzing starter card accounts. The process begins by determining whether a status of a starter card account is in a first statement stage of the trial period (i.e., only the first account statement is being generated to be sent to the customer) (Step 5100). The first statement may reflect a bill or credit card statement presented to a starter card customer indicating payment due (if any) based on previous purchases made with the starter card. In one aspect of the invention, a statement is provided to each starter card customer every month, thus the statements follow a monthly billing cycle within the trial period. In the event the status of the starter card account is in the first statement stage, the statement 1 process is performed (Step 5120). If the status of the starter card account is not in a first statement stage (Step 5100; NO), the monitor process determines whether a second statement stage is relevant (i.e., the second account statement is being generated to be sent to the customer) (Step 5200). In the event the status of the starter card account is in the second statement stage (Step 5200; YES), a statement 2 process is performed (Step 5220). If not, the monitor process proceeds to Step 5300. The pattern of checking to determine the current statement stage of the starter card account (Steps 5300-5700) continues until the appropriate statement process is performed (Steps 5320-5720). As shown in FIG. 5, in one aspect of the invention, a limit is imposed to the number of stages a starter card account may cycle through based on the predetermined trial period. For exemplary purposes, FIG. 5 shows that if the status of an account is not in stages 1-7, the account is deemed to be out of the trial period and the account may be removed from the target customer database (or dealt with in any other manners as determined by the credit card issuer 1200).

Figure 6:
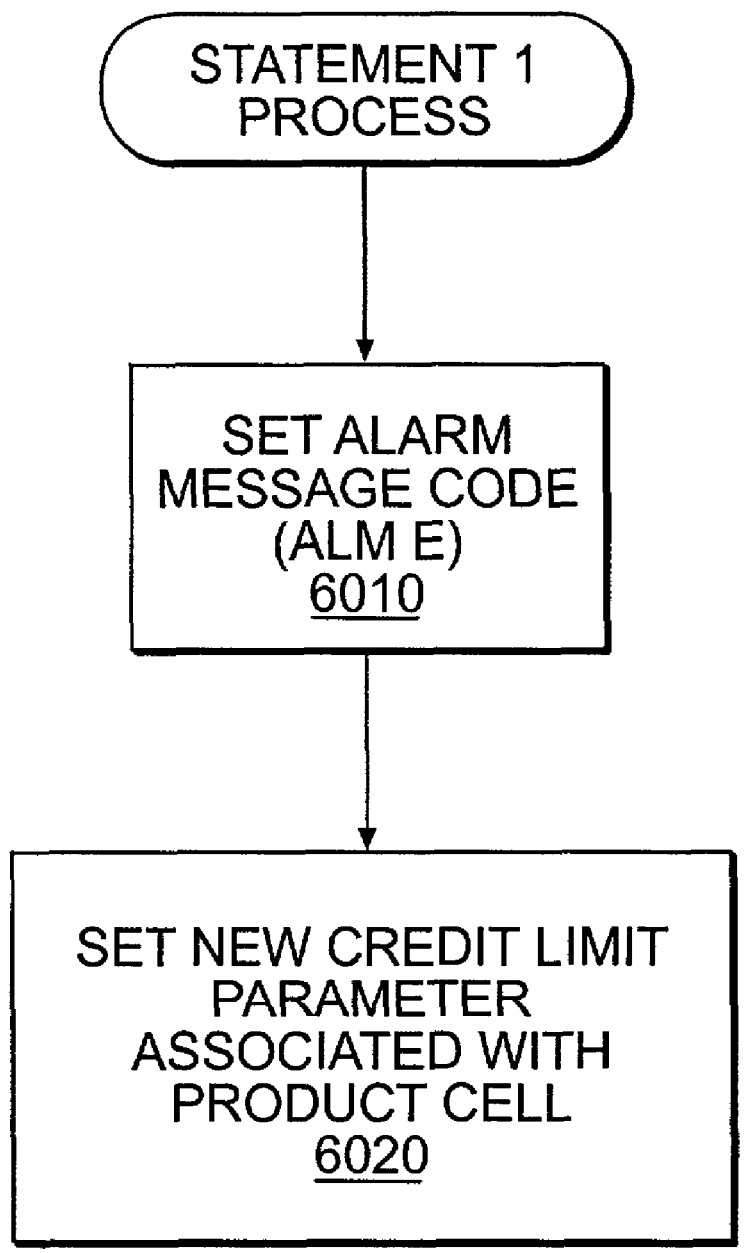
FIG. 6 illustrates an exemplary flowchart of a first statement process, consistent with features and principles of the present invention.

FIG. 6 illustrates an exemplary statement 1 process, consistent with features and principles of the present invention for implementing the process of Step 5120 of FIG. 5. A starter card account that is determined by the monitor process 2400 to be in a first statement stage, has an introductory account level message code "E" (see Table I) loaded into the ALM parameter of the starter account stored in the target customer database 2240 (Step 6010). In one aspect of the invention, monitor process 2400 then determines the product cell code associated the starter credit account (set as a product cell code in the product cell parameter field of the account). Depending on the product cell code, a new credit limit parameter associated with the starter card may be set at a determined value within the range depicted in the product cell's GRAD. CL range (Step 6020). For example, a starter card account with a product cell ("PC") code of "1" may have a new credit limit parameter (included in the target customer database 2240 for each starter card account) set at $500. As shown in Table IV, PC 1 has a GRAD. CL range of $200-$500. Accordingly, the new credit limit is set within the range of the GRAD. CL parameter and reflects the credit limit the starter card account will graduate to in the event the predetermined criteria is met within the trial period. The monitor process then returns to monitoring other starter card accounts until the next statement stage is met. Because no payment is due within the first statement stage (the customer just received the starter credit card product) there is no account activity to be monitored by monitor process 2400.

Figure 7:
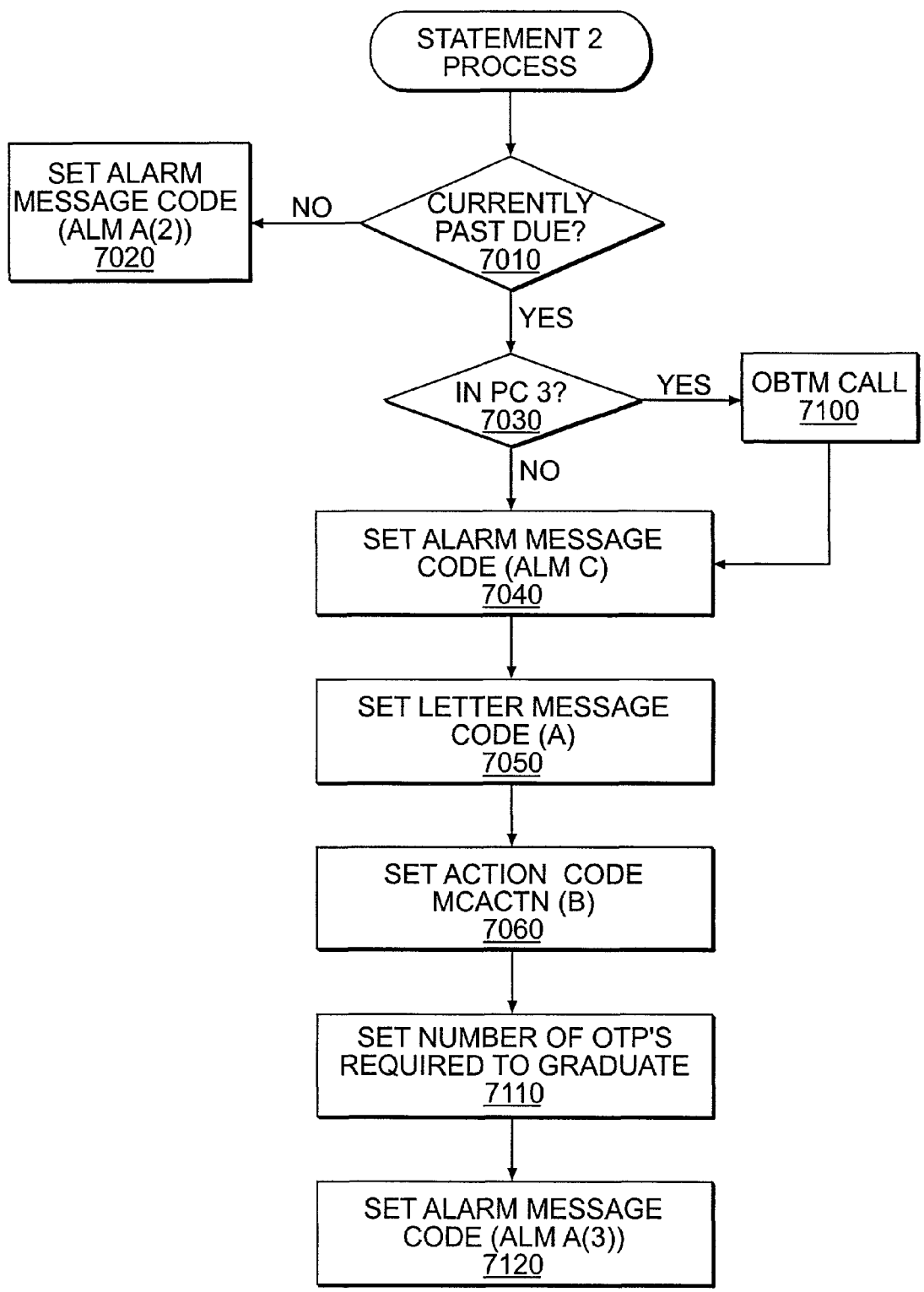
FIG. 7 illustrates an exemplary flowchart of a second statement process, consistent with features and principles of the present invention.

FIG. 7 illustrates an exemplary statement 2 process, consistent with features and principles of the present invention, for implementing the process of Step 5220 of FIG. 5. In the statement 2 process, monitor process 2400 first determines whether a starter card account is past due (the corresponding customer has not provided at least a minimum payment for purchases within the last statement stage) (Step 7010). In the event the starter card account is not currently past due (Step 7010; NO), an ALM code "A(2)" is set in the ALM parameter of the starter card account parameter stored in the target customer database 2240. Referring to Table I, an ALM "A(2)" code reflects a message that will be presented to the customer associated with the starter card account on the next statement generated by credit card issuer 1200. For example, ALM "A(2)" will initiate a message that may reflect the customer will receive a credit line increase after "2" more consecutive on-time payments. In one aspect of the invention, this message is appended to the statement being generated in the respective statement stage. In this case, the statement generated in statement stage 2 may include the ALM "A(2)" message.

However, if the starter card account is currently past due (the customer associated with the starter card account has not made an on-time payment that was due during the second statement stage), monitor process 2400 determines the type of product cell the starter card account is affiliated with. As shown in FIG. 7, in one aspect of the invention, product cell 3 is associated with different types of monitoring functions than other product cells, so monitor process 2400 determines whether the starter card account is affiliated with PC 3 (Step 7030). Credit card issuer 1200 may designate selected product cells to be processed differently by monitor process 2400 based on the target starter card customers affiliated with the selected product cells. In the above example, PC 3 may be chosen by credit card issuer 1200 for selective monitoring because PC 3 may be associated with downsell customers. It should be noted that variations of this process may be implemented depending upon the how credit card issuer 1200 wishes to handle selected ranked target customers. For example, product cells 4 and 5 may also be associated with the functions associated with product cell 3 depicted in FIG. 7.

Returning to Step 7030, if the starter card account is associated with PC 3 (Step 7030; YES), an outbound telemarketing message ("OBTM") is set indicating to credit card issuer 1200 that a customer service representative may contact the customer associated with the starter card account to inform them of the account's status (Step 7100). Processing then is directed to Step 7040. At step 7040, monitor process sets an ALM code "C" in the ALM parameter of the starter card account stored in target customer database 2240. Next, a letter message code "A" (Step 7050) and a call center code McACTN "B" (Step 7060) is set in the letter message code, and McACTN code, parameters, respectively, of the same starter card account. Each of these codes indicate to credit card issuer 1200 that the customer has failed to meet the predetermined criteria (consecutive payments), but is to receive another chance. The customer failed to meet the consecutive payment requirement because the customer missed an on-time payment that was due during statement stage 2. Therefore the customer will not be able to meet the three consecutive on-time payment requirement starting from statement stage 2. Accordingly, monitor process 2400 sets the criteria, in this case a new number of consecutive on-time payments ("OTPs"), required to graduate (Step 7110) and uses this information to set another ALM code "A(3)" (Step 7120). The customer associated with the starter card account may receive a statement (i.e., the statement generated during statement stage 2) that includes ALM message "C" and a separate letter (Letter Code "A") that indicates that a new trial period has been set, and with graduation criteria set at 3 consecutive on-time payments for graduation, indicated by the second ALM code "A(3)." In one aspect of the invention, credit card issuer 1200 may change the product cell parameter associated with a delinquent starter card account.

Figure 8:
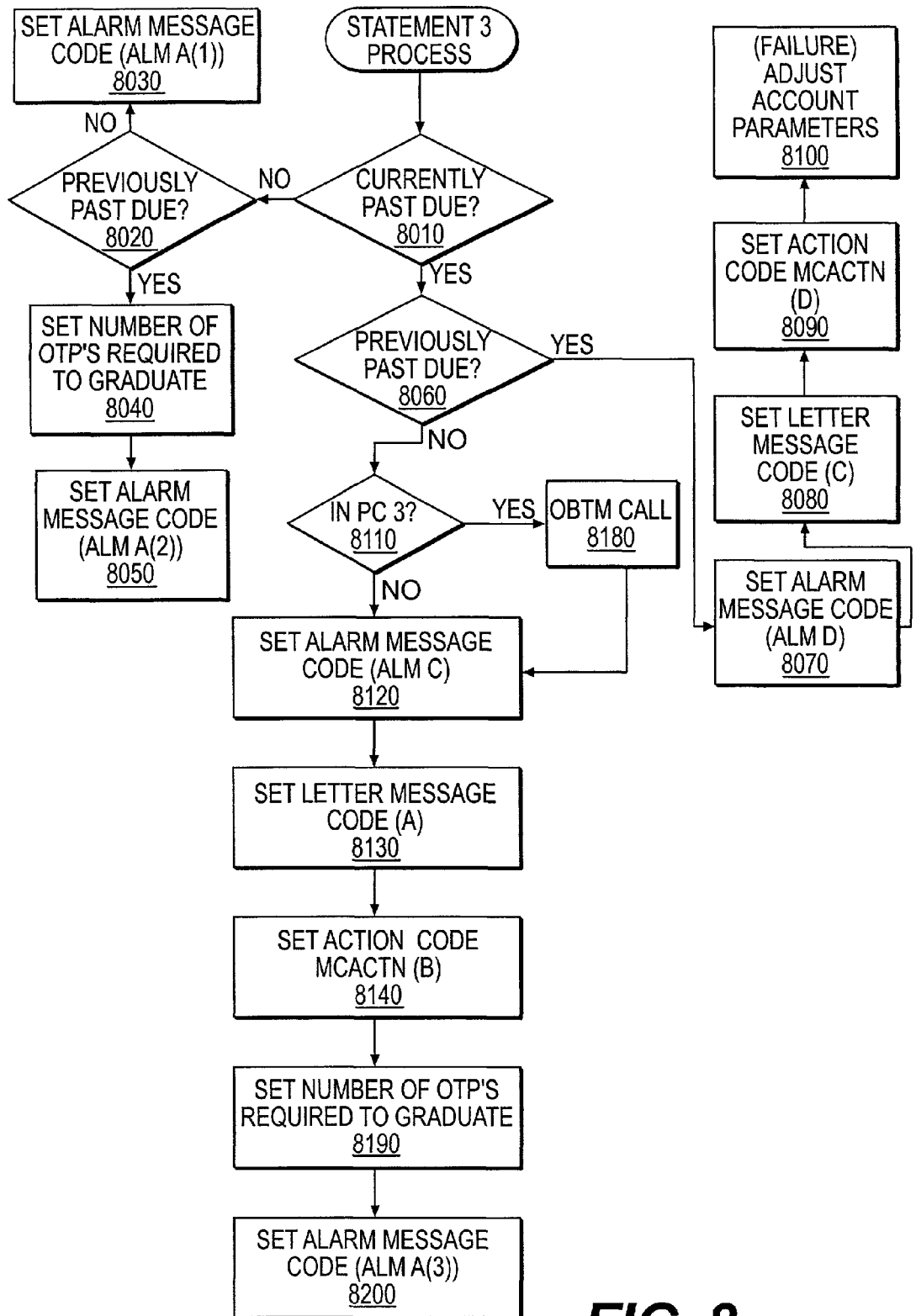
FIG. 8 illustrates an exemplary flowchart of a third statement process, consistent with features and principles of the present invention.

FIG. 8 illustrates an exemplary statement 3 process, consistent with features and principles of the present invention for implementing the process of Step 5320 of FIG. 5. In the statement 3 process, a starter card account has been through two statement stages, wherein at least one payment was required (stage 2) and another will be required (stage 3). Monitor process 2400 begins the statement 3 process by determining whether the starter card account is currently past due (no payment made that was due during the third statement stage) (Step 8010). If not, (Step 8010; NO), the monitor process 2400 determines whether the starter card account was previously past due (no payment made during the second statement stage) (Step 8020). In the event the customer associated with the starter card account has made the last two on-time payments, (Step 8020; NO), monitor process sets an ALM code "A(1)" in the ALM code parameter associated with the starter card account stored in the target customer database 2240, and the monitor process continues.

However, in the event the starter card account is previously past due (Step 8020; YES), the monitor process 2400 determines the number of OTPs required to graduate (new criteria) (Step 8040) and sets an ALM code "A(2)" in the ALM parameter of the starter card account stored in the target customer database 2240. Because the customer has made an on-time payment that was due during the third statement stage (not currently past due), the number of required OTPs is set at "2", allowing the customer to meet the predetermined criteria of 3 consecutive OTPs by making the next two payments on time. The monitor process then returns to FIG. 5 and continues monitoring statement stages.

Returning to Step 8010, in the event the starter card account is currently past due (Step 8010; YES), the monitor process 2400 determines whether the account is previously past due (Step 8060). If so, (Step 8060; YES), the monitor process 2400 sets an ALM code "D" in the ALM parameter of the starter card account stored in the target customer database 2240 (Step 8070). Also, in the same account, a letter code "C" (Step 8080) and an call center code McACTN "D" (Step 8090) are set. These codes (ALM "D," Letter code "C." and McACTN "D"), indicate to credit card issuer 1200 that the customer has failed to meet the required criteria within the trial period, at least twice. Accordingly, in one aspect of the invention, the customer is not given another chance to restart the trial period, and the account parameters associated with the failed starter card account are changed (Step 8100).

Changes to a failed starter card account may vary based on several factors, such as the type of product cell associated with the originally offered starter card account. Based on these factors, the monitor process 2400 may change selected parameters of the starter card account. For example, in one aspect of the invention, failed starter card accounts associated with product cells 1 and 2 may receive no credit line increase, an increase in APR % to 19.8%, but may still be used to purchase goods and/or services up to the available balance of the credit limit. On the other hand, failed starter card accounts associated with product cells 3-4 may also not receive a credit line increase and an increase of APR % to 19.8%, but may not utilize the account to purchase goods and/or services. This adjustment may include reducing the credit limit to zero, thus preventing use of the starter credit card account. Essentially, credit card issuer 1200 may tailor the ramifications of failing the trial period as needed to balance the risk of offering credit card products to high credit risk customers with the probability of customers accepting the offers for the starter credit card account in light of these ramifications.

Returning to Step 8060, in the event the starter card account is not previously past due (Step 8060; NO), monitor process 2400 determines the type of product cell the starter card account is affiliated with. As previously described with reference to FIG. 7, in one aspect of the invention, product cell 3 may be associated with different types of monitoring functions than other product cells, so monitor process 2400 determines whether the starter card account is affiliated with PC 3 (Step 8110). As previously mentioned, this process may be implemented depending upon the how credit card issuer 1200 wishes to handle selected ranked target customers. For example, product cells 4 and 5 may also be included with the functions associated with product cell 3 depicted in FIG. 8.

Returning to Step 8110, if the starter card account is associated with PC 3 (Step 8110; YES), an OBTM is set indicating to credit card issuer 1200 that a customer service representative may contact the customer associated with the starter card account to inform them of the account's status (Step 8180). Processing is then directed to Step 8120.

At Step 8120, monitor process sets an ALM code "C" in the ALM parameter of the starter card account stored in target customer database 2240. Next, a letter message code "A" (Step 8130) and a call center code McACTN "B" (Step 8140) is set in the letter message code, and McACTN code, parameters, respectively, of the same starter card account. Each of these codes indicate to credit card issuer 1200 that the customer has failed to meet the predetermined criteria (in this case consecutive on-time payments) within the set trial period, but is to receive another chance. Therefore, monitor process 2400 sets the criteria, in this case the number of consecutive OTPs, required to graduate (Step 8190) and uses this information to set another ALM code "A(3)" (Step 8200).

Accordingly, the customer associated with the starter card account may receive a statement that includes ALM message "C" and a separate letter (Letter Code "A") that indicates that a new trial period has been set, and with graduation criteria set at 3 consecutive on-time payments for graduation, indicated by the second ALM code "A(3)."

Figure 9:
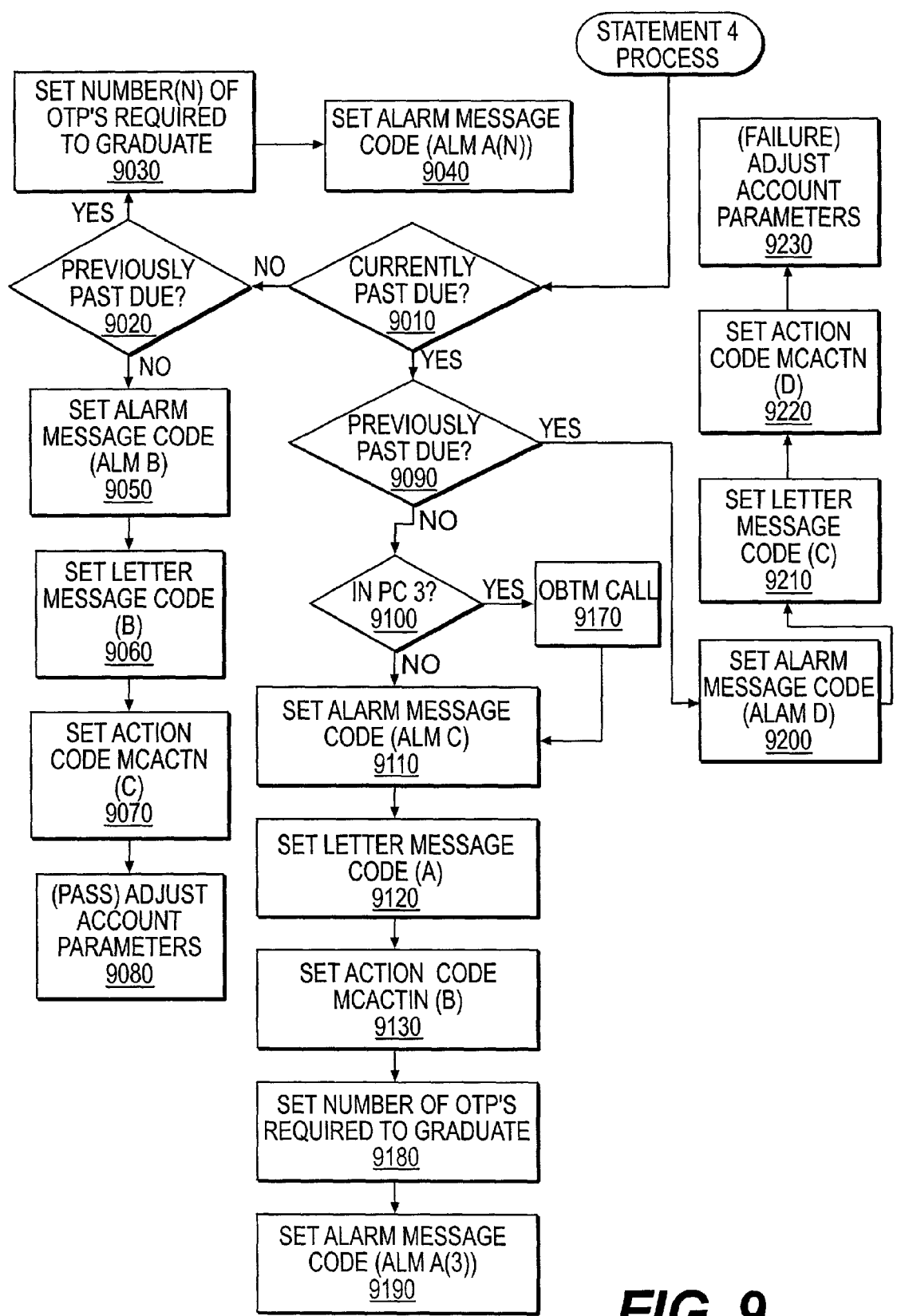
FIG. 9 illustrates an exemplary flowchart of a fourth statement process, consistent with features and principles of the present invention.

FIG. 9 illustrates an exemplary statement 4 process, consistent with features and principles of the present invention, for implementing the process of Step 5420 of FIG. 5. In the statement 4 process, a starter card account has been through three statement stages, and a fourth statement is being generated. Monitor process 2400 begins the statement 4 process by determining whether the starter card account is currently past due (did the customer make an OTP that was due in statement stage 4) (Step 9010). If not (Step 9010; NO), monitor process 2400 determines whether the starter card account was previously past due (Step 9020). If the starter card account is previously past due, monitor process 2400 may be configured to keep the account in the trial period by determining the number ("N") of OTPs required to graduate (Step 9030), and setting an ALM code "A(N)" in the ALM parameter of the starter card account stored in the target customer database 2240 (Step 9040). The number "N" may be based on the type of product cell the starter card account is associated with, and whether the customer has made any OTPs during the trial period up to statement stage 4. Rules database 2260 may include selective rules that monitor process 2400 may access to determine a value of "N" based on these, and possibly, other factors. For exemplary purposes, the predetermined criteria of three consecutive OTPs governs the monitor process 2400. Thus, because if the starter account was previously past due while credit card issuer 1200 is generating the fourth statement, the value "N" may only equal "1" or "2." A value N=1 would depict a missed OTP during statement stage 2, thus requiring only one more OTP to meet the determined criteria. On the other hand, a value N=2 would depict a missed OTP during statement stage 3 and require an OTP during statement stages 5 and 6 in order for the customer to meet the predetermined thee consecutive OTPs criteria.

Returning back to Step 9020, in the event the starter card account is not previously past due (Step 9020; NO), monitor process 2400 may set an ALM code "B" (Step 9050), a letter code "B" (Step 9060), and a call center code McACTN "C" (Step 9070) in the starter card account stored in the target customer database 2240. These codes indicate to credit card issuer 1200 that the customer associated with the starter card account has met the criteria of three consecutive OTPs, and that the account is eligible for graduation parameters. Monitor process 2400 adjusts the credit card account stored in the target customer database 2240 to indicate that the graduation parameters should be activated, thus allowing the account to be processed with these parameters. For example, once a customer associated with the graduated account receives the notifications corresponding to the ALM, letter, and McACTN codes, they may use the starter credit card product to purchase goods and/or services with the added credit indicated by the new credit limit parameter activated by monitor process 2400.

Returning to Step 9010, in the event the starter card account is currently past due (Step 9010; YES), the monitor process 2400 determines again whether the account was previously past due (Step 9090). If so, (Step 9090; YES), the monitor process 2400 sets an ALM code "D" in the ALM parameter of the starter card account stored in the target customer database 2240 (Step 9200). Also, in the same account, a letter code "C" (Step 9210) and an call center code McACTN "D" (Step 9220) are set. These codes (ALM "D," Letter code "C," and McACTN "D"), indicate to credit card issuer 1200 that the customer has failed to meet the required criteria within the trial period, at least twice. Accordingly, in one aspect of the invention, the customer is not given another chance to restart the trial period, and the account parameters associated with the failed starter card account are changed in a manner similar to that described in FIG. 8, Step 8100.

Returning to Step 9090, in the event the starter card account is not previously past due (Step 9090; NO), monitor process 2400 determines the type of product cell the starter card account is affiliated with. As previously described with reference to FIG. 8, in one aspect of the invention, product cell 3 may be associated with different types of functions then other product cells, so monitor process 2400 determines whether the starter card account is affiliated with PC 3 (Step 9100). Alternately, other product cells, such as product cells 4 and 5, may also be included with the functions associated with product cell 3 depicted in FIG. 9.

Returning to Step 9100, if the starter card account is associated with PC 3 (Step 9100; YES), an OBTM code is set indicating to credit card issuer 1200 that a customer service representative may contact the customer associated with the starter card account to inform them of the account's status (Step 9170). Processing is then directed to Step 9110. At Step 9110, monitor process sets an ALM code "C" in the ALM parameter of the starter card account stored in target customer database 2240. Next, a letter message code "A" (Step 9120) and a call center code McACTN "B" (Step 9130) is set in the letter message code, and McACTN code, parameters, respectively, of the same starter card account. Each of these codes indicate to credit card issuer 1200 that the customer has failed to meet the predetermined criteria (in this case consecutive on-time payments) within the set trial period up to statement stage 4, but is eligible to receive another chance. Therefore, monitor process 2400 sets the criteria, in this case the number of consecutive OTPs, required to graduate (Step 9180) and uses this information to set another ALM code "A(3)" (Step 9190). Accordingly, the customer associated with the starter card account may receive a statement that includes ALM message "C" and a separate letter (Letter Code "A") that indicates that a new trial period has been set, and with graduation criteria set at 3 consecutive on-time payments for graduation, indicated by the second ALM code "A(3)."

Figure 10:
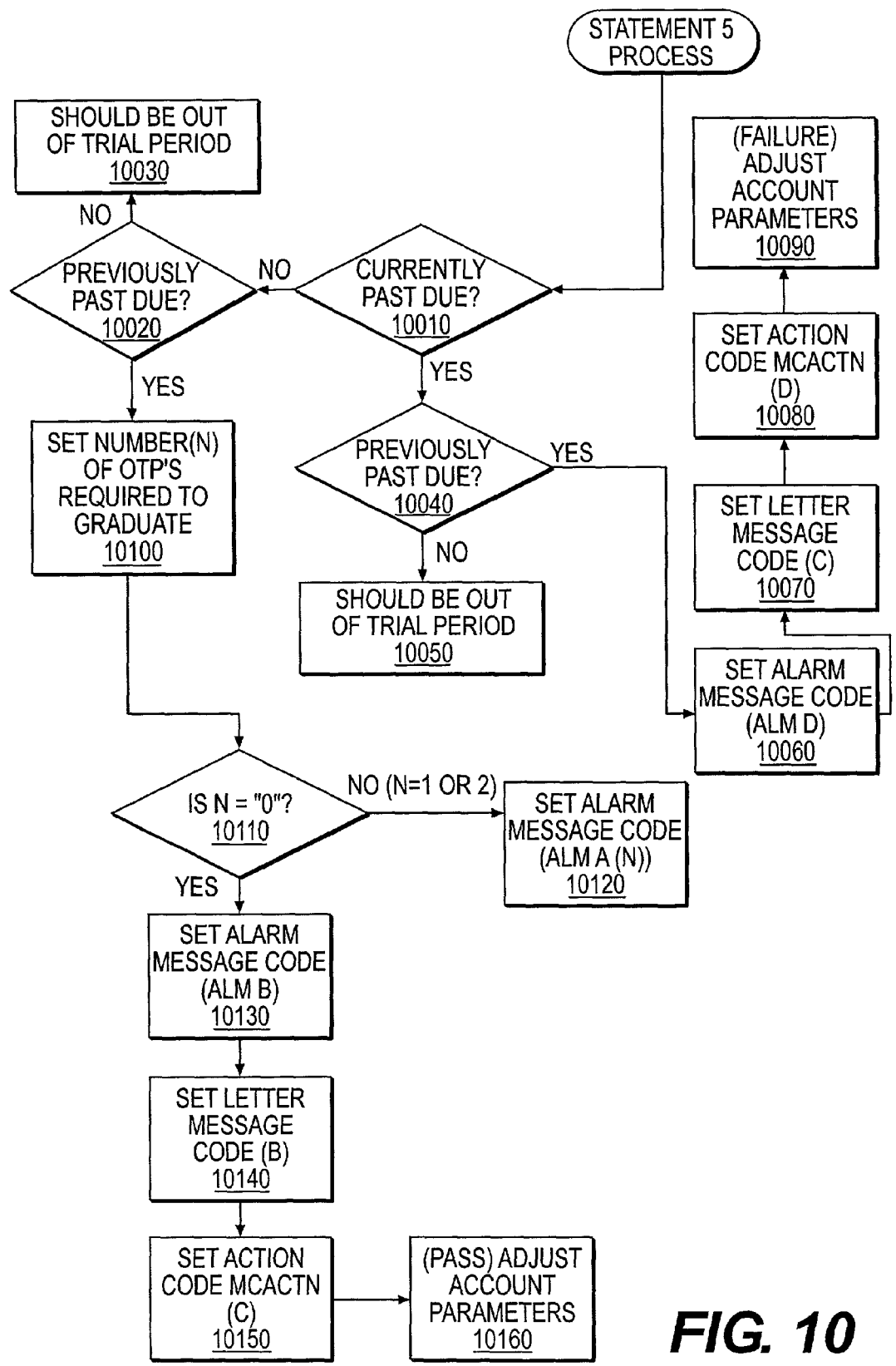
FIG. 10 illustrates an exemplary flowchart of a fifth statement process, consistent with features and principles of the present invention.

FIG. 10 illustrates an exemplary statement 5 process, consistent with features and principles of the present invention, for implementing the process of Step 5520 of FIG. 5. Monitor process 2400 begins the statement 5 process by determining whether the starter card account is currently past due (Step 10010). If not (Step 10010; NO), monitor process 2400 determines whether the starter card account is previously past due (Step 10020). If the starter card account is not previously past due (Step 10020; NO), the starter card account should have been removed from the trial period because the customer did not miss any OTPs by the statement 5 stage (Step 10030). Accordingly, monitor process 2400 may flag this account as being erroneously included in the trial period, and a message may be sent to a representative to follow up on the status of the account. Alternatively, monitor process 2400 may perform a default process to activate the graduation parameters associated with this account as if the starter card account has graduated in the statement 5 stage.

Returning to Step 10020, if monitor process 2400 determines that the starter account is previously past due (Step 10020; YES), it determines a number "N" of OTPs required to graduate based on the payments history of the account (Step 10100). For example, the customer associated with the starter card account may have missed an OTP that was due during statement stage 2, but made OTPs that were due during stages 3, 4 and 5. In this case the number of OTPs would be determined by the monitor process 2400 as "0." On the other hand, if the customer associated with the starter card account missed an OTP during stage 3, but made an OTP during stages 4 and 5, the number of required OTPs to graduate would be set at "1." Based on the calculated required number of OTPs to graduate, monitor process 2400 may perform different tasks. For instance, as shown in FIG. 10, if the number "N" of required OTPs is equal to "1" or "2," an ALM code "A(N)" in the ALM code parameter of the starter card account stored in the target customer database (Step 10120), and the monitor process returns to FIG. 5 for processing.

However, if the number "N" of required OTPs is equal to "0," monitor process 2400 may set an ALM code "B" (Step 10130), a letter code "B" (Step 10140), and a call center code McACTN "C" (Step 10150) in the starter card account stored in the target customer database 2240. These codes indicate to credit card issuer 1200 that the customer associated with the starter card account has met the criteria of three consecutive OTPs, and that the account is eligible for graduation. Subsequently, monitor process 2400 activates the graduation parameters associated with starter account (Step 10160), similar to the tasks performed in FIG. 9, Step 9080.

Returning to Step 10010, in the event the starter card account is currently past due (Step 10010; YES), the monitor process 2400 determines whether the account is previously past due (Step 10040). If so, (Step 10040; YES), the monitor process 2400 sets an ALM code "D" in the ALM parameter of the starter card account stored in the target customer database 2240 (Step 10060). Also, in the same account, a letter code "C" (Step 10070) and an call center code McACTN "D" (Step 10080) are set. These codes (ALM "D," Letter code "C." and McACTN "D," indicate to credit card issuer 1200 that the customer has failed to meet the required criteria within the trial period, at least twice. Accordingly, in one aspect of the invention, the customer is not given another chance to restart the trial period, and the account parameters associated with the failed starter card account are changed in a manner similar to that described in FIG. 8, Step 8100.

On the other hand, referring back to Step 10040, if the starter card account is not previously past due (Step 10040; NO), the starter card account should have been removed from the trial period because the customer did not miss any OTPs previous to the statement 5 stage (Step 10050). Accordingly, monitor process 2400 may flag this account as being erroneously included in the trial period, and a message may be sent to a representative to follow up on the status of the account. Alternatively, monitor process 2400 may perform a default process to activate the graduation parameters associated with this account as if the starter card account has graduated at the statement 5 stage.

Figure 11:
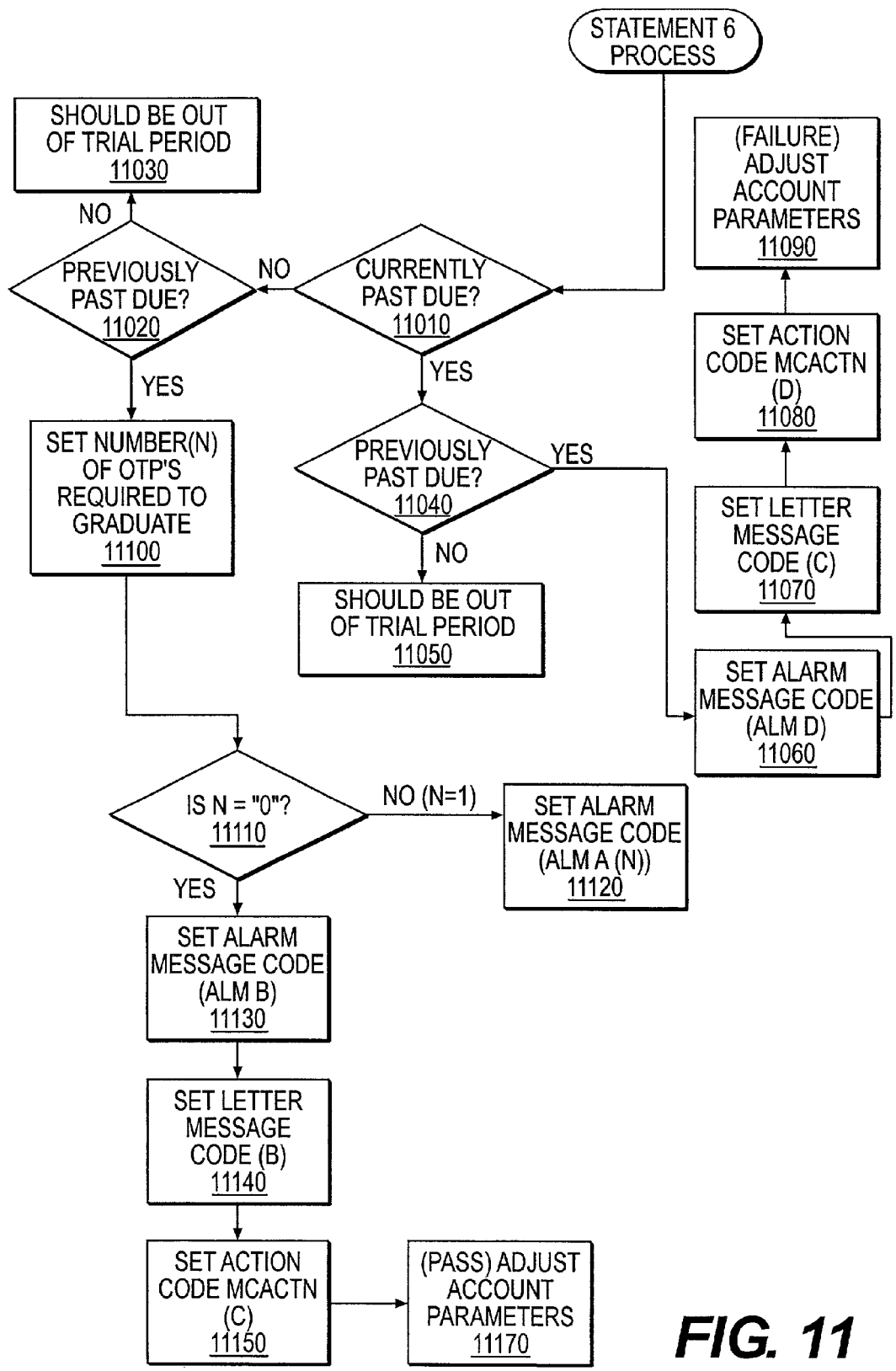
FIG. 11 illustrates an exemplary flowchart of a sixth statement process, consistent with features and principles of the present invention.

FIG. 11 illustrates an exemplary statement 6 process, consistent with features and principles of the present invention, for implementing the process of Step 5620 of FIG. 5. Monitor process 2400 begins the statement 6 process by determining whether the starter card account is currently past due (Step 11010). If not (Step 11010; NO), monitor process 2400 determines whether the starter card account is previously past due (Step 11020). If the starter card account is not previously past due (Step 11020; NO), the starter card account should have been removed from the trial period because the customer did not miss any OTPs by the sixth statement stage (Step 11030). Accordingly, monitor process 2400 may flag this account as being erroneously included in the trial period, and a message may be sent to a representative to follow up on the status of the account. Alternatively, monitor process 2400 may activate a default process to activate the graduation parameters associated with this account as if the starter card account has graduated at the statement 5 stage.

Returning to Step 11020, if monitor process 2400 determines that the starter account was previously past due (Step 11020; YES), it determines a number "N" of OTPs required to graduate based on the payments history of the account (Step 11100). For example, the customer associated with the starter card account may have missed an OTP during statement stage 3, but made OTPs that were due during stages 4, 5 and 6. In this case the number "N" of OTPs would be determined by the monitor process 2400 as "0." On the other hand, if the customer associated with the starter card account missed an OTP during stage 4, but made an OTP during stages 5 and 6, the number "N" of required OTPs to graduate would be set at "2." Based on the calculated required number of OTPs to graduate, monitor process 2400 may perform different tasks. For instance, in one aspect of the invention, if the number "N" of required OTPs is equal to "1" (Step 11110; NO), an ALM code "A(N)" in the ALM code parameter of the starter card account stored in the target customer database (Step 11120), and the monitor process returns to FIG. 3 for processing.

In another aspect of the invention, criteria associated with the requirement of three consecutive OTPs may include not allowing two missed payments at anytime during the trial period. In this aspect, as shown in FIG. 11, the required number of OTPs cannot equal "2" without having two previous missed payments between statement stages 1-6. Accordingly, monitor process may bypass checking for "N=2," and default to failing the starter card account if "N" does not equal "1" or "0."

Returning back to Step 11110, if the number "N" of required OTPs is equal to "0," (Step 11110; YES), monitor process 2400 may set an ALM code "B" (Step 11130), a letter code "B" (Step 11140), and a call center code McACTN "C" (Step 11150) in the starter card account stored in the target customer database 2240. These codes indicate to credit card issuer 1200 that the customer associated with the starter card account has met the criteria of three consecutive OTPs, and that the account is eligible for graduation parameters. Subsequently, monitor process 2400 activates the graduation parameters associated with starter account (Step 11170), similar to the tasks performed in FIG. 9, Step 9080.

Returning to Step 11010, in the event the starter card account is currently past due (Step 11010; YES), the monitor process 2400 determines again whether the account was previously past due (Step 11040). If so, (Step 11040; YES), the monitor process 2400 sets an ALM code "D" in the ALM parameter of the starter card account stored in the target customer database 2240 (Step 11060). Also, in the same account, a letter code "C" (Step 11070) and an call center code McACTN "D" (Step 11080) are set. These codes (ALM "D," Letter code "C." and McACTN "D," indicate to credit card issuer 1200 that the customer has failed to meet the required criteria within the trial period, at least twice. Accordingly, in one aspect of the invention, the customer is not given another chance to restart the trial period, and the account parameters associated with the failed starter card account are changed in a manner similar to that described in FIG. 8, Step 8100.

On the other hand, referring back to Step 10040, if the starter card account is not previously past due (Step 11040; NO), the starter card account should have been removed from the trial period because the customer did not miss any OTPs previous to the statement 5 stage (Step 11050). Accordingly, monitor process 2400 may flag this account as being erroneously included in the trial period, and a message may be sent to a representative to follow up on the status of the account. Alternatively, monitor process 2400 may perform a default process to activate the graduation parameters associated with this account as if the starter card account has graduated at the statement 5 stage.

Figure 12:
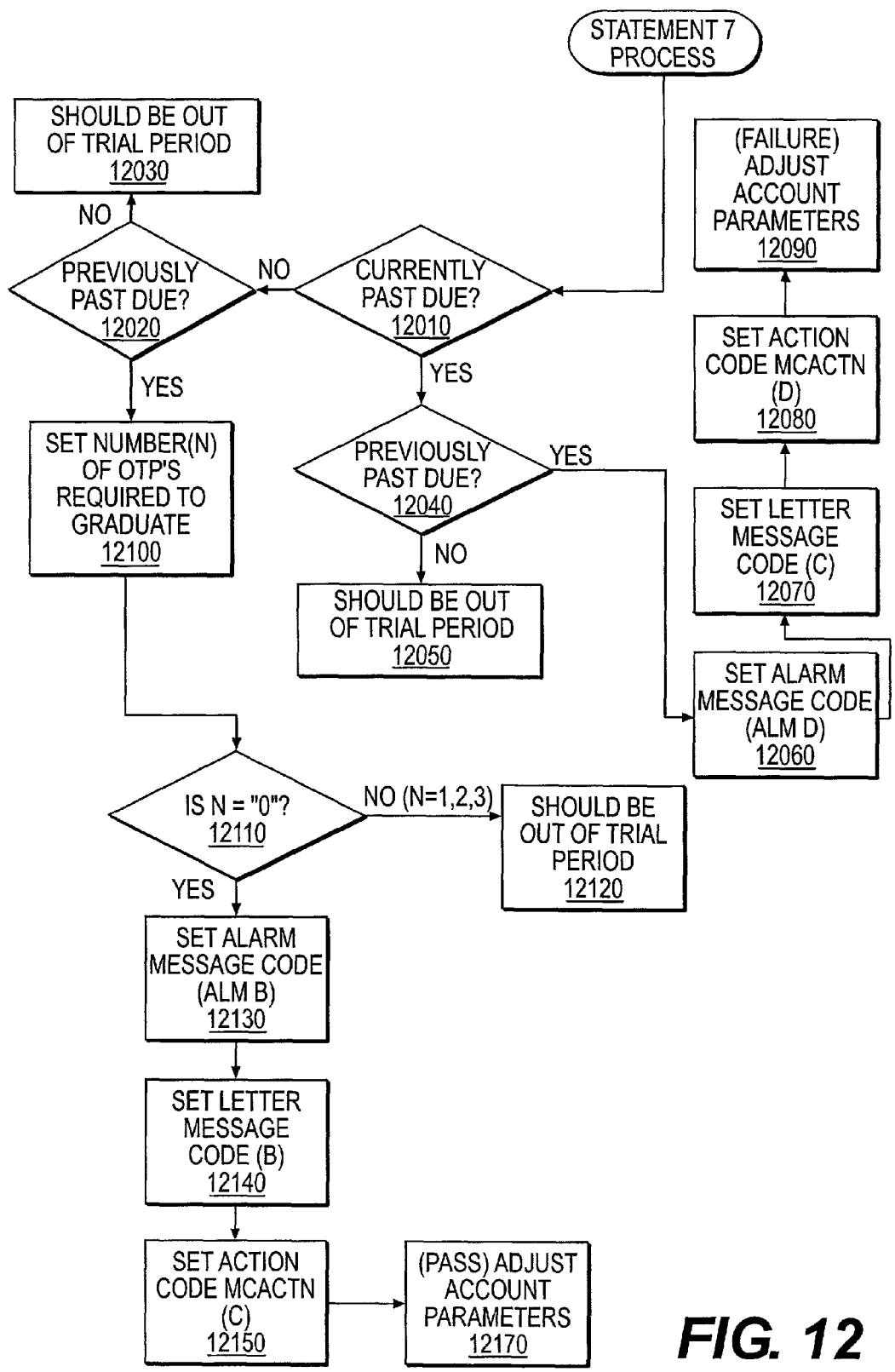
FIG. 12 illustrates an exemplary flowchart of a seventh statement process, consistent with features and principles of the present invention.

FIG. 12 illustrates an exemplary statement 7 process, consistent with features and principles of the present invention, for implementing the process of Step 5720 of FIG. 5. Monitor process 2400 begins the statement 7 process by determining whether the starter card account is currently past due (Step 12010). If not (Step 12010; NO), monitor process 2400 determines whether the starter card account was previously past due (Step 12020). If the starter card account was not previously past due (Step 12020; NO), the starter card account should have been removed from the trial period because the customer did not miss any OTPs by the seventh statement stage (Step 12030). Monitor process 2400 may process the starter account in a similar manner to that described in FIG. 11, Step 11030.

Returning to Step 12020, if monitor process 2400 determines that the starter account is previously past due (Step 12020; YES), it determines a number "N" of OTPs required to graduate based on the payments history of the account (Step 12100). Similar to FIGS. 10 and 11, based on the calculated required number of OTPs to graduate, monitor process 2400 may perform different tasks. In one aspect of the invention, as shown in FIG. 12, if the number "N" of required OTPs is equal to "1," "2," or "3," monitor process 2400 may determine that the starter card account should have been removed from the trial period prior to the statement 7 process (Step 12120). Monitor process 2400 may determine this based on another criteria set forth by target customer process 2100 that requires a customer not to miss any two OTPs during a trial period. Alternately, the trial period may be set to end after the seventh statement stage, thus eliminating the possibility for a customer to meet the required three consecutive OTPs by the seventh stage. Accordingly, monitor process determines that the starter card should be out of the trial period and may notify a representative of the erroneously status of the account.

However, if the number "N" of required OTPs is equal to "0," monitor process 2400 may set an ALM code "B" (Step 12130), a letter code "B" (Step 12140), and a call center code McACTN "C" (Step 12150) in the starter card account stored in the target customer database 2240. These codes indicate to credit card issuer 1200 that the customer associated with the starter card account has met the criteria of three consecutive OTPs, and that the account is eligible for graduation parameters. Subsequently, monitor process 2400 activates the graduation parameters associated with starter account (Step 12170), similar to the tasks performed in FIG. 9, Step 9080.

Returning to Step 12010, in the event the starter card account was currently past due (Step 12010; YES), the monitor process 2400 determines again whether the account is previously past due (Step 12040). If so, (Step 10040; YES), the monitor process 2400 sets an ALM code "D" in the ALM parameter of the starter card account stored in the target customer database 2240 (Step 12060). Also, in the same account, a letter code "C" (Step 12070) and an call center code McACTN "D" (Step 12080) are set. These codes (ALM "D," Letter code "C." and McACTN "D," indicate to credit card issuer 1200 that the customer has dfailed to meet the required criteria within the trial period, at least twice. Accordingly, in one aspect of the invention, the customer is not given another chance to restart the trial period, and the account parameters associated with the failed starter card account are changed in a manner similar to that described in FIG. 8, Step 8100.

On the other hand, referring back to Step 12040, if the starter card account was not previously past due (Step 12040; NO), the starter card account should have been removed from the trial period because the customer did not miss any OTPs previous to the seventh statement stage (Step 12050). Accordingly, monitor process 2400 may process the starter card account in a manner similar to that performed in FIG. 11, Step 11030.

As described, methods and systems consistent with features and principles of the present invention enable a credit card issuer to provide customized starter credit card products to customers whom normally would not be eligible for standard credit card products. In managing the starter card accounts, credit card issuer 1200 monitors parameters and activities against defined criteria associated with each starter card account. As previously mentioned, the parameters and starter card account information may be kept in a starter card database 2200 during a defined trial period. While the starter card account data is kept in database 220, credit card issuer 1200 may prevent the account from being accessed or utilized by other processes operating within credit card issuer 1200. For example, credit card issuer 1200 may also include processes that interact with central database 2300 for management of the standard credit accounts maintained therein. Furthermore, test processes may also access the account information within customer account database 2300 to perform marketing and solicitation tests for credit card issuer 1200. These processes may be prevented from accessing the starter card accounts kept with starter card database 2200.

However, in one aspect of the invention, selected starter card accounts that have either graduated or failed, based on selected criteria, may be loaded into customer account database, and accessed in the same manner as standard credit card accounts. To facilitate this process, loader process 2500 may periodically check the status of each starter card account stored in target customer database 2240 to determine whether an account is "ready" for loading. A "ready" account may be designated as a starter card account that has If either failed based on selected criteria (such as two missed payments within a trial period) or graduated. Other specifications to define a "ready" account may also be utilized by methods and systems consistent with features of the present invention, and are not limited to the examples mentioned above.

FIG. 13 illustrates an exemplary loading chart that loading process 2500 may follow to load starter card account information from target customer database 2240 to customer account database 2300. For exemplary purposes, the chart depicted in FIG. 13 is associated with a trial period set at seven statement stages and a requirement of three consecutive OTPs without two missed payments during the trial period.

As shown in FIG. 13, statement stage indicator 1310 reflects the current stage a starter card account is currently be processed. Row 1320 may reflect the payment number associated with a corresponding statement stage, while rows 1330 reflect various PASS/FAIL codes associated with the types of activities performed with the starter card account. A key 1335 defines the elements included within the loading chart.

As shown in FIG. 13, key element 1340 indicates that no payment was due by the customer during that statement stage. Key element 1350 defines "OTP" as an on-time payment, while key element 1360 defines "NO" as a missed payment during a particular statement stage. Key element 1370 defines "LAG" as a lag period. A lag period is associated with starter card accounts that have failed a trial period. As previously discussed, credit card issuer 1200 may define particular failure parameters associated with each starter card account. One of those failure parameters is an increased APR %. Credit card issuer 1200 may institute an increasing APR % based on a failing starter card account, up to 25%, for example for particular delinquent accounts. To "soften the blow" on a customer who has been participating in a trial period where an trial APR % of 0% was implemented, a lag period may be provided with an intermediate failure APR %, such as 19.8% before changing the APR % to the maximum amount of 25%. This may give a delinquent customer time to adjust to the new intermediate APR %, but also to educate the customer in the ramifications of holding a credit account with a interest rate much higher that 0%. Returning to FIG. 13, the last key element 1380 defines when loader process 2500 begins to load the starter card account into the customer account database 2300.

Therefore, referring to PASS code 4 within the loading chart shown in FIG. 13, a starter card account that is in, for example, statement stage 5, and has missed an OTP during statement stage 4, may still meet the criteria of three consecutive OTPs by the end of the trial period set at stage 7. However, a starter card account in the same statement stage 5 that has either missed two OTPs in stages 1-4, or missed a single payment during stage 5, will not be eligible to graduate. (See FAIL codes 5-10). Each of the PASS/FAIL codes 1330 may be used by monitor process 2400 to indicate the status of a starter card account stored in target customer database 2240. A parameter for these codes may be associated with each starter card account and defined by the monitor process 2400 during the monitor process. Loader process 2500 may also use these codes to determine which starter card accounts are ready for loading, as well a lag period parameter to indicate whether two lag periods have passed.

Accordingly, loader process may use the PASS/FAIL codes, (or alternately a "ready" code parameter associated with each starter card account) to aid in its process to determine whether an account is ready for loading. As shown in FIG. 13, all accounts that have graduated (PASS codes) are loaded into customer account database 2300 without waiting for any lag periods. Conversely, every starter card account with FAIL codes associated with it have two consecutive lag periods before they are loaded into customer account database 2300.

As described, methods and systems consistent with features and principles of the present invention enable a credit card issuer to provide starter credit card products to customers not eligible to obtain standard credit card products. The starter card products include defined parameters that allow the credit card issuer to control and monitor the activities of a restive account, while at the same time give incentive to high credit risk customers to train themselves to make payments consistently, and in a timely fashion.

Variations of the methods and systems consistent with the present invention previously described may be implemented without departing from the scope of the invention. For example, the starter credit card accounts offered and managed by credit card issuer 1200 may be presented to individuals other than high credit risk customers. The target customers identified by credit card issuer 1200 may include standard credit card customers, or customers of competing credit card issuers. Also, the starter products may be associated with other types of financial or credit products, including financial loans offered by financial institutions, such as banks and mortgage lenders. Furthermore, the sequence of processes performed by credit card issuer 1200 during the monitor process is not limited to the examples depicted in FIGS. 3-12. For instance, any number of consecutive OTPs may be used; meet a certain percentage of OTPs over a predetermined period or over the trial period; may fail when any number of late payments (not just two as previously described); or fail when a payment is late a consecutive number of times. Alternately, variations of these processes, as well as analysis of the product cells, and starter card account parameters may be modified to suit the purposes and marketing goals of institutions offering the starter card products.

Additionally, the results of a starter card account meeting a predefined criteria may vary as well. For example, a starter card account may be put through consecutive trial periods with a gradual increase in benefits (and parameters) associated with the starter card account after each successful trial period. For instance, a credit card issuer may increase the credit limit and interest rate of a starter card account that has met a predefined criteria in a first trial period. However, the increased credit limit and interest rate may be valid only during a second trial period. After the starter card account has met another predefined criteria (which may or may not be the same criteria used for the first trial period) in a subsequent trial period, the credit limit and interest rate may change again. This sequence may continue until the starter card account is eligible for a standard credit card offered by the credit card issuer.

Also, methods, systems, and articles of manufacturer, consistent with features and principles of the present invention may provide customers with starter card account "tracts" when presenting offers for these accounts. Starter card account "tracts" may be various graduation roadmaps that describe various conditions and graduation parameters that may be obtained when the customer meets predetermined criteria. For example, a customer may be presented, perhaps through a web site or conventional mail solicitation, a number of starter card tracts from which the customer may chose to receive a starter credit account. For instance, a first tract may include parameters associated with product cell 1 previously described in Table IV. Additionally, the first tract may describe the type of criteria that must be met, and whether the graduation parameters include another trail period. On the other hand, a second tract may include starter credit account parameters that are different that the first tract. For example, the second tract may include an interest rate higher that that included in the first tract, but with a higher credit limit.

Additionally, systems, methods and articles of manufacturer consistent with features and principles of the present invention may implement a "never-ending" trial period for customers who fail to meet the predetermined criteria associated their respective credit accounts. For example, a credit account issuer may enroll a customer into a starter credit account that allows a new trial period to begin each time the customer fails to meet the predetermined criteria defined for their credit account. The new trial periods may be associated with the same starter account parameters and criteria as the previous trial period, or may include modified parameters and/or criteria.

Furthermore, although aspects of the present invention are described as being associated with data stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described embodiments, but instead is defined by the appended claims in light of their full scope of equivalents

What is claimed is:

1. A system for providing a starter credit account, comprising:
    a processor; and
    a memory storing a set of instructions that, when executed by the processor, perform operations comprising:
        providing a plurality of credit accounts including at least one starter credit account associated with starter credit account parameters and at (east one standard credit account associated with standard credit account parameters that are more favorable than the starter credit account parameters, wherein the starter credit account is provided to a trial customer who is not eligible to obtain the standard credit account;
        monitoring the starter credit account to determine whether the trial customer has met predetermined criteria associated with the starter credit account during a trial period and adjusting the starter credit account parameters based on the determination;
        modifying the duration of the trial period based on activities associated with the starter credit account;
        storing credit account information associated with standard credit account customers of the credit issuer in a first memory;
        storing starter credit account information associated with the trial customer in a second memory; and
        loading the starter credit account information stored in the second memory into the first memory after the starter credit account parameters associated with the starter credit account have been adjusted based on the determination.

2. The system of claim 1, wherein the parameters include a credit limit and the operation of monitoring comprises increasing the credit limit when it is determined that the trial customer has met the predetermined criteria during the trial period.

3. The system of claim 1, wherein the parameters further include an interest rate and the operation of monitoring comprises adjusting the interest rate when the trial customer has met the predetermined criteria.

4. The system of claim 1, wherein the parameters include an interest rate and a credit limit and the operation of monitoring comprises reducing the credit limit and adjusting the interest rate when the trial customer has not met the predetermined criteria.

5. The system of claim 4, wherein the credit limit is reduced to zero.

6. The system of claim 1, wherein the operation of monitoring comprises restarting the trial period when the trial customer has not met the predetermined criteria and monitoring the starter credit account to determine whether the trial customer has met the predetermined criteria during the restarted trial period.

7. The system of claim 1, wherein the memory further stores instructions that, when executed by the processor, cause the processor to perform operations comprising:
    determining a group of customers who are not eligible to obtain the standard credit account;
    ranking the group of customers based on each customer's credit profile, wherein the trial customer is included in the group of ranked customers; and
    wherein the operation of monitoring adjusts the starter credit account parameters associated with the starter credit account based on the ranking of the trial customer.

8. A non-transitory computer-readable medium storing instructions operable to cause one or more processors to perform operations comprising:
  receiving a request for the standard credit account from the customer;
  providing a starter credit account in place of the standard credit account to the customer;
  monitoring the customer's activities associated with the starter credit account during a trial period to determine whether the customer has satisfied predetermined criteria;
  modifying the duration of the trial period based on the monitored customer's activities associated with the starter credit account; and
  upgrading at least one of the starter credit account parameters to match at least one of the standard credit account parameters when the customer has satisfied the predetermined criteria.

9. The computer-readable medium of claim 8, wherein the starter credit account parameters include at least a starter credit limit, and wherein the operation of monitoring the customer's activities comprises:
  determining whether the customer has an outstanding balance associated with the starter credit limit; and
  determining whether the customer has made a payment toward the outstanding balance.

10. The computer-readable medium of claim 9, wherein the operation of determining whether the customer has made a payment further comprises:
  determining whether the customer has made the payment within an acceptable period of time.

11. The computer-readable medium of claim 8, wherein the operation of upgrading at least one of the starter credit account parameters comprises:
  increasing a starter credit limit associated with the starter credit account when the customer has satisfied the predetermined criteria.

12. The computer-readable medium of claim 8, wherein the operation of upgrading at least one of the starter credit account parameters comprises:
  increasing a starter credit limit associated with the starter credit account and adjusting an interest rate associated with the starter credit account when the customer has satisfied the predetermined criteria during the trial period.

13. The computer-readable medium of claim 12, wherein the predetermined criteria include at least one of making a predetermined number of consecutive on time payments, and not exceeding the starter credit limit.

14. The computer-readable medium of claim 8, wherein the operation of upgrading at least one of the starter credit account parameters is replaced with:
  downgrading at east one of the starter credit account parameters based on the monitoring.

15. The computer-readable medium of claim 14, wherein the operation of downgrading further comprises:
  determining that the customer has not met a predetermined criteria during the trial period based on the monitoring; and
  restarting the trial period.

16. The computer-readable medium of claim 14, wherein the operation of downgrading further comprises:
  determining that the customer has not met a predetermined criteria during the trial period based on the monitoring;
  preventing use of the starter credit account to purchase goods and/or services;
  increasing an interest rate associated with the starter credit account; and
  assessing penalty fees to the starter credit account.

17. A non-transitory computer-readable medium storing instructions operable to cause one or more processors to perform operations comprising:
  providing a starter credit account to a customer, wherein the customer is not eligible to receive a standard credit account;
  monitoring the customers activities associated with the starter credit account during a trial period to determine whether the customer has satisfied predetermined criteria during the trial period;
  notifying the customer of unsatisfied predetermined criteria during the trial period; and
  modifying the starter credit account parameters based on the monitoring, wherein modifying includes upgrading at least one of the starter credit account parameters to match at least one of the standard credit account parameters when the customer has satisfied the predetermined criteria during the trial period.

18. The computer-readable medium of claim 17, wherein the starter credit account parameters include at least a starter credit limit, and wherein the operation of monitoring the customers activities comprises:
  determining whether the customer has an outstanding balance associated with the starter credit limit; and
  determining whether the customer has made a payment toward the outstanding balance.

19. The computer-readable medium of claim 18, wherein the operation of determining whether the customer has made a payment further comprises:
  determining whether the customer has made the payment within an acceptable period of time.

20. The computer-readable medium of claim 17, wherein the operation of modifying the starter credit account parameters comprises:
  increasing a starter credit limit associated with the starter credit account and adjusting an interest rate associated with the starter credit account when the customer has satisfied the predetermined criteria during the trial period.

21. The computer-readable medium of claim 20, wherein the predetermined criteria include at least one of making a predetermined number of consecutive on time payments, and not exceeding the starter credit limit.

22. The computer-readable medium of claim 17, wherein the operation of modifying the starter credit account parameters comprises:
  downgrading at least one of the starter credit account parameters based on the monitoring.

23. The computer-readable medium of claim 22, wherein the operation of downgrading comprises:
  determining that the customer has not satisfied the predetermined criteria during the trial period based on the monitoring; and
  restarting the trial period.

24. The computer-readable medium of claim 22, wherein the operation of downgrading comprises:
  determining that the customer has not satisfied the predetermined criteria during the trial period based on the monitoring;
  preventing use of the starter credit account to purchase goods and/or services;
  increasing an interest rate associated with the starter credit account; and
  assessing penalty fees to the starter credit account.

25. A non-transitory computer-readable medium storing instructions operable to cause one or more processors to perform operations comprising:

determining a group of customers with existing credit histories who have not previously applied for the standard credit account and are eligible for the starter credit account, wherein the customers included in the group each have a credit profile that prevents the customers from obtaining the standard credit account;

ranking the customers included in the group;

providing a starter credit account to each customer included in the group, wherein parameters associated with each starter credit account vary based on the rank of each customer;

determining a trial period for each ranked customer;

determining, for each ranked customer, a predetermined criteria that the customer must satisfy for the starter credit account parameters to be upgraded; and for each ranked customer:
determining whether the ranked customer has met the predetermined criteria during the trial period; and
upgrading the account parameters associated with the ranked customer based on the determination.

26. The computer-readable medium of claim 25, wherein the operation of adjusting the account parameters comprises:
increasing a credit limit associated with the starter credit account when the customer has met the predetermined criteria.

27. The computer-readable medium of claim 25, wherein the operation of adjusting the account parameters comprises:
adjusting an interest rate associated with the starter credit account when the customer has met the predetermined criteria.

28. The computer-readable medium of claim 25, wherein the operation of adjusting the account parameters comprises:
adjusting the account parameters to reflect parameters equivalent to parameters associated with the standard credit account when the customer has met the predetermined criteria.

29. The computer-readable medium of claim 25, wherein the operation of adjusting the account parameters comprises:
restarting the trial period when the customer has not met the predetermined criteria and based on the rank of the customer.

30. The computer-readable medium of claim 25, wherein the operation of adjusting the account parameters comprises:
preventing the starter credit account from being used to purchase goods and/or services when the customer has not met the predetermined criteria and based on the rank of the customer.

31. The computer-readable medium of claim 25, wherein the operation of ranking the customers included in the group comprises:
ranking the customers based on the credit profile of each customer included in the group.

32. The computer-readable medium of claim 25, wherein the predetermined criteria include at least one of making a number of consecutive on-time payments, and not exceeding a credit limit associated with the starter credit account.

33. The computer-readable medium of claim 25, wherein the operation of determining whether the ranked customer has met the predetermined criteria during the trial period comprises:
determining at predetermined intervals within the trial period whether the customer has made a number of consecutive on-time payments associated with their respective starter credit account.

34. A non-transitory computer-readable medium storing instructions operable to cause one or more processors to perform operations for providing credit accounts, the operations comprising:

receiving a request from a customer for a first credit account associated with a first account parameters included a first credit limit and a first interest rate;

providing to the customer a second credit account associated with second account parameters including a second credit limit and a second interest rate, wherein the second credit limit is lower than the first credit limit;

notifying the customer of a third credit limit while the customer is provided the second credit limit, the notifying including information reflecting that the third credit limit is obtainable by making a predetermined number of consecutive on time payments and wherein the third credit limit is higher than the second credit limit and lower than the first credit limit;

monitoring the second credit account to determine whether the customer has made the predetermined number of consecutive on time payments; and changing the second credit limit to the third credit limit when it is determined that the customer has made the predetermined number of on-time payments associated with the second credit account.

35. The computer-readable medium of claim 34, wherein the third credit limit is based on a predetermined amount based on a number of on-time payments made by the customer.

36. A non-transitory computer-readable medium storing instructions operable to cause one or more processors to perform operations for providing credit accounts, the operations comprising:

receiving a request from a customer for a first credit account associated with first account parameters including a first credit limit and a first interest rate;

providing to the customer a second credit account associated with second account parameters including a second credit limit and a second interest rate;

monitoring the second credit account to determine whether the customer has performed at least one of making a predetermined number of consecutive on time payments or not exceeding the second credit limit; and changing the second interest rate to a third interest rate that is higher than the first interest rate, when it is determined that the customer has made the predetermined number of on-time payments associated with the second credit account.

37. A system for providing a credit account to a customer of an account issuer that provides a starter credit account associated with starter credit account parameters and a standard credit account associated with standard credit account parameters more favorable than the starter credit account parameters, comprising:

a processor; and a memory storing a set of instructions that, when executed by the processor, perform operations comprising:
receiving a request for the standard credit account from the customer;
providing a starter credit account in place of the standard credit account to the customer;
monitoring the customer's activities associated with the starter credit account during a trial period to determine whether the customer has satisfied predetermined criteria;

modifying the duration of the trial period based on the monitored customer's activities associated with the starter credit account; and upgrading at least one of the starter credit account parameters to match at least one of the standard credit account parameters when the customer has satisfied the predetermined criteria.

38. The system of claim 37, wherein the starter credit account parameters include at least a starter credit limit, and wherein the operation of monitoring the customer's activities comprises:

determining whether the customer has an outstanding balance associated with the starter credit limit; and determining whether the customer has made a payment toward the outstanding balance.

39. The system of claim 38, wherein the operation of determining whether the customer has made a payment further comprises:

determining whether the customer has made the payment within an acceptable period of time.

40. The system of claim 37, wherein the operation of upgrading at least one of the starter credit account parameters comprises:

increasing a starter credit limit associated with the starter credit account when the customer has satisfied the predetermined criteria.

41. The system of claim 37, wherein the operation of upgrading at least one of the starter credit account parameters comprises:

increasing a starter credit limit associated with the starter credit account and adjusting an interest rate associated with the starter credit account when the customer has satisfied the predetermined criteria during the trial period.

42. The system of claim 41, wherein the predetermined criteria include at least one of making a predetermined number of consecutive on time payments or not exceeding the starter credit limit.

43. The system of claim 37, wherein the operation of upgrading at least one of the starter credit account parameters is replaced with:

downgrading at least one of the starter credit account parameters based on the monitoring.

44. The system of claim 43, wherein the operation of downgrading further comprises:

determining that the customer has not met a predetermined criteria during the trial period based on the monitoring; and restarting the trial period.

45. The system of claim 43, wherein the operation of downgrading further comprises:

determining that the customer has not met a predetermined criteria during the trial period based on the monitoring;

preventing use of the starter credit account to purchase goods and/or services;

increasing an interest rate associated with the starter credit account; and assessing penalty fees to the starter credit account.

46. A system for providing a credit account to a customer of a credit issuer that provides a starter credit account associated with starter credit account parameters and a standard credit account associated with standard credit account parameters more favorable than the starter credit account parameters, comprising:

a processor; and a memory storing a set of instructions that, when executed by the processor, perform operations comprising:

providing a starter credit account to a customer, wherein the customer is not eligible to receive a standard credit account;

monitoring the customers activities associated with the starter credit account during a trial period to determine whether the customer has satisfied predetermined criteria during the trial period;

notifying the customer of unsatisfied predetermined criteria during the trial period; and modifying the starter credit account parameters based on the monitoring, wherein the modifying includes upgrading at least one of the starter credit account parameters to match at least one of the standard credit account parameters when the customer has satisfied the predetermined criteria during the trial period.

47. The system of claim 46, wherein the starter credit account parameters include at least a starter credit limit, and wherein the operation of monitoring the customers activities comprises:

determining whether the customer has an outstanding balance associated with the starter credit limit; and determining whether the customer has made a payment toward the outstanding balance.

48. The system of claim 47, wherein the operation of determining whether the customer has made a payment further comprises:

determining whether the customer has made the payment within an acceptable period of time.

49. The system of claim 46, wherein the operation of modifying the starter credit account parameters comprises:

increasing a starter credit limit associated with the starter credit account and adjusting an interest rate associated with the starter credit account when the customer has satisfied the predetermined criteria during the trial period.

50. The system of claim 49, wherein the predetermined criteria include at least one of making a predetermined number of consecutive on time payments, and not exceeding the starter credit limit.

51. The system of claim 46, wherein the operation of modifying the starter credit account parameters comprises:

downgrading at least one of the starter credit account parameters based on the monitoring.

52. The system of claim 51, wherein the operation of downgrading comprises:

determining that the customer has not satisfied the predetermined criteria during the trial period based on the monitoring; and restarting the trial period.

53. The system of claim 51, wherein the operation of downgrading comprises:

determining that the customer has not satisfied the predetermined criteria during the trial period based on the monitoring;

preventing use of the starter credit account to purchase goods and/or services;

increasing an interest rate associated with the starter credit account; and assessing penalty fees to the starter credit account.

54. A system for providing a credit account to a customer of a credit issuer that provides a starter credit account associated with starter credit account parameters and a standard credit account associated with standard credit account parameters more favorable than the starter credit account parameters, comprising:

a processor; and a memory storing a set of instructions that, when executed by the processor, perform operations comprising:
  determining a group of customers with existing credit histories who have not previously applied for the standard credit account and are eligible for the starter credit account, wherein the customers included in the group each have a credit profile that prevents the customers from obtaining the standard credit account;
  ranking the customers included in the group;
  providing a starter credit account to each customer included in the group, wherein parameters associated with each starter credit account vary based on the rank of each customer;
  determining a trial period for each ranked customer;
  determining, for each ranked customer, a predetermined criteria that the customer must satisfy for the starter credit account parameters to be upgraded;
  determining, for each customer, whether the ranked customer has met the predetermined criteria during the trial period; and
  upgrading, for each customer, the account parameters associated with the ranked customer based on the determination.

55. The system of claim 54, wherein the operation of adjusting the account parameters comprises:
  increasing a credit limit associated with the starter credit account when the customer has met the predetermined criteria.

56. The system of claim 54, wherein the operation of adjusting the account parameters comprises:
  adjusting an interest rate associated with the starter credit account when the customer has met the predetermined criteria.

57. The system of claim 54, wherein the operation of adjusting the account parameters comprises:
  adjusting the account parameters to reflect parameters equivalent to parameters associated with the standard credit account when the customer has met the predetermined criteria.

58. The system of claim 54, wherein the operation of adjusting the account parameters comprises:
  restarting the trial period when the customer has not met the predetermined criteria and based on the rank of the customer.

59. The system of claim 54, wherein the operation of adjusting the account parameters comprises:
  preventing the starter credit account from being used to purchase goods and/or services when the customer has not met the predetermined criteria and based on the rank of the customer.

60. The system of claim 54, wherein the operation of ranking the customers included in the group comprises:
  ranking the customers based on the credit profile of each customer included in the group.

61. The system of claim 54, wherein the predetermined criteria include at least one of making a number of consecutive on-time payments, and not exceeding a credit limit associated with the starter credit account.

62. The system of claim 54, wherein the operation of determining whether the ranked customer has met the predetermined criteria during the trial period comprises:
  determining at predetermined intervals within the trial period whether the customer has made a number of consecutive on-time payments associated with their respective starter credit account.

63. A system for providing credit accounts, comprising:
  processor; and
  a memory storing a set of instruction that, when executed by the processor, perform operations comprising:
    receiving a request from a customer for a first credit account associated with a first account parameters included a first credit limit and a first interest rate;
    providing to the customer a second credit account associated with second account parameters including a second credit limit and a second interest rate, wherein the second credit limit is lower than the first credit limit;
    notifying the customer of a third credit limit while the customer is provided the second credit limit, the notifying including information reflecting that the third credit limit is obtainable by making a predetermined number of consecutive on time payments and wherein the third credit limit is higher than the second credit limit and lower than the first credit limit;
    monitoring the second credit account to determine whether the customer has made the predetermined number of consecutive on time payments; and
    changing the second credit limit to the third credit limit when it is determined that the customer has made the predetermined number of on-time payments associated with the second credit account.

64. The system of claim 63, wherein the third credit limit is based on a predetermined amount based on a number of on-time payments made by the customer.

65. A system for providing credit accounts, comprising;
  a processor; and
  memory storing a set of instructions that, when executed by the processor, perform operations comprising:
    receiving a request from a customer for a first credit account associated with a first account parameters included a first credit limit and a first interest rate;
    providing to the customer a second credit account associated with second account parameters including a second credit limit and a second interest rate;
    monitoring the second credit account to determine whether the customer has performed at least one of making a predetermined number of consecutive on time payments or not exceededing the second credit limit; and
    changing the second interest rate to a third interest rate that is higher than the first interest rate, when it is determined that the customer has made the predetermined number of on-time payments associated with the second credit account.

66. A non-transitory computer-readable medium storing instructions operable to cause one or more processors o perform operation comprising:
  providing the starter credit account to the customer, wherein the customer is not eligible to receive the standard credit account;
  monitoring the customer's activities associated with the starter credit account during a first trial period to determine whether the customer has satisfied first predetermined criteria during the first trial period;
  modifying the starter credit account parameters based on the monitoring, the modifying including starting a second trial period and upgrading the starter credit account parameters if the customer has satisfied the predetermined criteria during the first trial period;
  further monitoring the customer's activities associated with the modified starter credit account parameters during the second trial period to determine whether the customer has satisfied second predetermined criteria during the second trial period; and further modifying the modified starter credit account parameters based on the further monitoring.

67. The computer-readable medium of claim 66, wherein the second predetermined criteria is the same as the first predetermined criteria.

68. The computer-readable medium of claim 66, wherein the second predetermined criteria is not the same as the first predetermined criteria.

69. The computer-readable medium of claim 66, wherein the operation of modifying the starter credit account parameters based on the monitoring comprises:
increasing a credit limit associated with the starter credit account.

70. The computer-readable medium of claim 69, wherein the operation of further modifying the starter credit account parameters based on the further monitoring comprises:
further increasing the credit limit associated with the starter credit account.

71. A system for providing a credit account to a customer of a credit issuer that provides a starter credit account associated with starter credit account parameters and a standard credit account associated with standard credit account parameters more favorable than the starter credit account parameters, comprising:
a processor; and
a memory storing a set of instructions that, when executed by the processor, perform operations comprising:
providing the starter credit account to the customer, wherein the customer is not eligible to receive the standard credit account;
monitoring the customers activities associated with the starter credit account during a first trial period to determine whether the customer has satisfied first predetermined criteria during the trial period;
modifying the starter credit account parameters based on the monitoring, the modifying including starting a second trial period and upgrading the starter credit account parameters if the customer has satisfied the first predetermined criteria during the first trial period;
further monitoring the customer's activities associated with the modified starter credit account parameters during the second trial period to determine whether the customer has satisfied second predetermined criteria during the second trial period; and
further modifying the modified starter credit account parameters based on the further monitoring.

72. The system of claim 71, wherein the second predetermined criteria is the same as the first predetermined criteria.

73. The system of claim 71, wherein the second predetermined criteria is not the same as the first predetermined criteria.

74. The system of claim 71, wherein the operation of modifying the starter credit account parameters based on the monitoring comprises:
increasing a credit limit associated with the starter credit account.

75. The system of claim 74, wherein the operation of further modifying the starter credit account parameters based on the further monitoring comprises:
further increasing the credit limit associated with the starter credit account.

76. The non-transitory computer-readable medium of claim 8, wherein the operation of providing a starter credit account in place of the standard credit account includes:
providing the starter credit account in response to the request for he standard credit account received from the customer.

77. The system of claim 37, wherein the operation of providing a starter credit account in place of the standard credit account includes:
providing the starter credit account in response to the request for the standard credit account received from the customer.

* * * * *

UNITED STATES PATENT AND TRADEMARK OFFICE
CERTIFICATE OF CORRECTION

PATENT NO. : 8,407,136 B2  
APPLICATION NO. : 09/880777  
DATED : March 26, 2013  
INVENTOR(S) : Keira Brooke Bard et al.

Page 1 of 1

It is certified that error appears in the above-identified patent and that said Letters Patent is hereby corrected as shown below:

In the Claims

Claim 1, col. 26, line 9, "at (east one" should read -- at least one --.

Claim 13, col. 27, line 49, "on time payments" should read -- on-time payments --.

Claim 21, col. 28, line 45, "on time payments" should read -- on-time payments --.

Claim 34, col. 30, line 7, "included a first" should read -- including a first --.

Claim 34, col. 30, line 17, "on time payments" should read -- on-time payments --.

Claim 34, col. 30, line 22, "on time payments" should read -- on-time payments --.

Claim 36, col. 30, line 44, "on time payments" should read -- on-time payments --.

Claim 42, col. 31, line 37, "on time payments" should read -- on-time payments --.

Claim 46, col. 32, line 4, "the customers activities" should read -- the customer's activities --.

Claim 47, col. 32, line 19, "the customers activities" should read -- the customer's activities --.

Claim 50, col. 32, line 39, "on time payments" should read -- on-time payments --.

Claim 63, col. 34, line 5, "included a first" should read -- including a first --.

Claim 65, col. 34, line 30, "memory storing a set" should read -- a memory storing a set --.

Claim 65, col. 34, lines 40-41, "on time payments" should read -- on-time payments --.

Claim 66, col. 34, lines 49-50, "processor o perform" should read -- processor to perform --.

Signed and Sealed this  
Second Day of July, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,407,136 B2  
APPLICATION NO. : 09/880777  
DATED : March 26, 2013  
INVENTOR(S) : Bard et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2398 days.

Signed and Sealed this  
Sixth Day of January, 2015

Michelle K. Lee  
*Deputy Director of the United States Patent and Trademark Office*